(12) United States Patent
Hirasawa et al.

(10) Patent No.: US 8,421,914 B2
(45) Date of Patent: Apr. 16, 2013

(54) METHOD AND APPARATUS CONVERTING MOVING IMAGE, METHOD AND APPARATUS FOR REPRODUCING MOVING IMAGE, AND COMPUTER PROGRAM

(75) Inventors: Yasutaka Hirasawa, Tokyo (JP); Seiji Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 1316 days.

(21) Appl. No.: 12/169,129

(22) Filed: Jul. 8, 2008

(65) Prior Publication Data

US 2009/0015710 A1 Jan. 15, 2009

(30) Foreign Application Priority Data

Jul. 9, 2007 (JP) ................ P2007-179265

(51) Int. Cl.
*H04N 11/02* (2006.01)

(52) U.S. Cl.
USPC ........... 348/425.1; 348/451; 375/240; 375/24

(58) Field of Classification Search ............... 348/425.1, 348/451, 554; 375/240.08, 240.14, 240.21; H04N 5/917
See application file for complete search history.

(56) References Cited

U.S. PATENT DOCUMENTS

| 5,436,665 A * | 7/1995 | Ueno et al. ............... 375/240.14 |
| 5,583,575 A * | 12/1996 | Arita et al. .................... 348/451 |
| 6,233,279 B1 * | 5/2001 | Boon ....................... 375/240.08 |
| 6,249,549 B1 * | 6/2001 | Kim .......................... 375/240.21 |
| 2005/0259740 A1 | 11/2005 | Kobayashi et al. |
| 2008/0225168 A1 * | 9/2008 | Ouslis et al. .................. 348/554 |

FOREIGN PATENT DOCUMENTS

| JP | 08-336046 | 12/1996 |
| JP | 2004-165776 | 6/2004 |
| JP | 2005-198268 | 7/2005 |
| JP | 2006-5904 | 1/2006 |

\* cited by examiner

*Primary Examiner* — Gims Philippe
*Assistant Examiner* — Richard Carter
(74) *Attorney, Agent, or Firm* — Finnegan, Henderson, Farabow, Garrett & Dunner, L.L.P.

(57) ABSTRACT

A down-sampling operation is performed on moving image data to reduce a sample count of the data to 1/M times the original sample count. In the down-sampling operation, a band-limitation operation is performed on the moving image data using a low-pass filter. The low-pass filter has a stop band frequency that prevents a harmonic component having a K-th order or higher, of harmonic components generated in the down-sampling operation, from overlapping an original signal component. The down-sampling operation is then performed on the band-limited moving image data, thereby compressing the moving image data. Aliasing distortion caused by a harmonic component of a high order is controlled. The resulting compressed image is free from a substantial loss of a high-frequency component of the original signal.

13 Claims, 16 Drawing Sheets

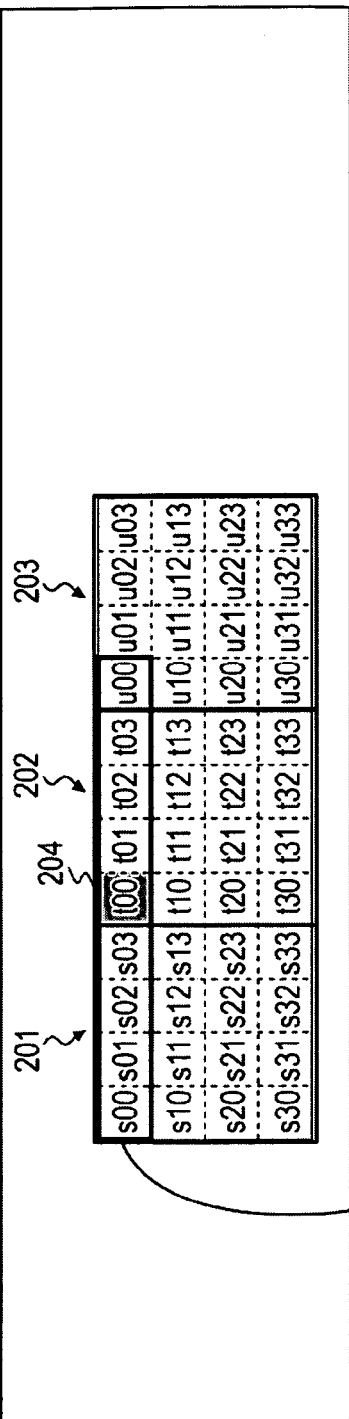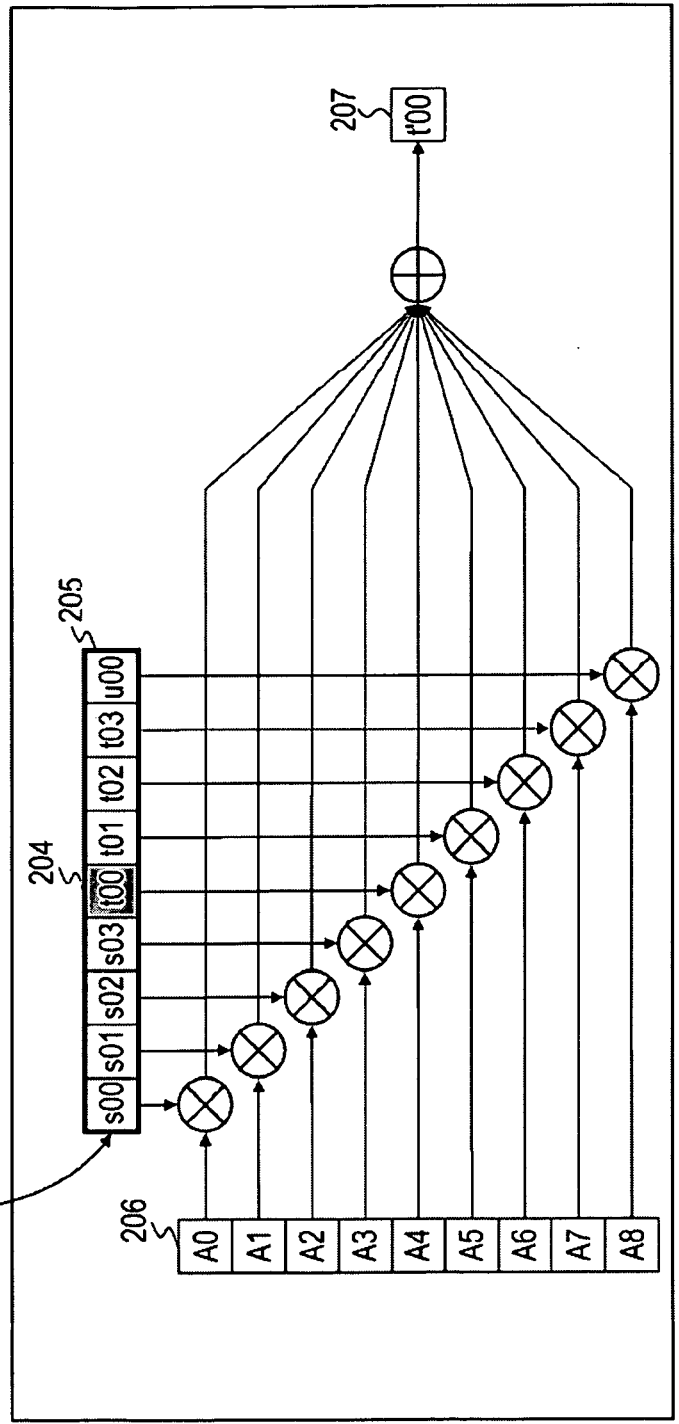
FIG. 5A
FIG. 5B

METHOD AND APPARATUS CONVERTING MOVING IMAGE, METHOD AND APPARATUS FOR REPRODUCING MOVING IMAGE, AND COMPUTER PROGRAM

CROSS REFERENCES TO RELATED APPLICATIONS

The present invention contains subject matter related to Japanese Patent Application JP 2007-179265 filed in the Japanese Patent Office on Jul. 9, 2007, the entire contents of which are incorporated herein by reference.

BACKGROUND OF THE INVENTION

1. Field of the Invention

The present invention relates to a method and apparatus for converting a moving image, a method and apparatus for reproducing a moving image, and a computer program. In particular, the present invention relates to a method and apparatus for converting a moving image, a method and apparatus for reproducing a moving image, and a computer program for performing a high-quality data conversion in a manner free from image degradation in data compression process of moving image data.

2. Description of the Related Art

When moving image data is stored onto a recording medium such as a hard disk (HD), a digital versatile disk (DVD), a Blu-ray disk (a next-generation disk) or is distributed over a network, a data conversion for reducing an amount of the data, for example, a compression process is performed on the data. Today, quality of the moving image data has been substantially improved. For example, high-definition data is in widespread use. As the high-quality data is used, an amount of data handled is also increased. Techniques for improving compression efficiency in the compression process of the moving image data and preventing the data from being degraded in the course of the compression process have been studied.

The compression methods of a moving image includes a decimation process for decimating pixels forming an image frame of the moving image data, namely, a spatial decimation process, and a frame rate reduction process, namely, a decimation process in time axis.

Data amount reduction in the data conversion allows the data to be stored efficiently onto a recording medium or to be transferred efficiently via a network. When the compressed data is then reproduced, image degradation takes place. If original image data has a high resolution, the degree of image degradation becomes pronounced.

A variety of techniques have been studied to reduce such an image degradation. Japanese Unexamined Patent Application Publication No. 2005-198268 discloses an image compression process technique that switches between a pixel count decimation process in a spatial direction and a pixel count decimation process in a time direction in response to the magnitude of a movement speed of a subject. Japanese Unexamined Patent Application Publication No. 2006-5904 discloses a technique that further changes phase at a sampling point in response to a movement speed of a subject in the pixel count decimation process in the spatial direction in addition to the technique disclosed in Japanese Unexamined Patent Application Publication No. 2005-198268.

SUMMARY OF THE INVENTION

The mode of operation in the compression process is changed in response to characteristics required of a target image in the known art in order to enhance data quality. The compression methods disclosed heretofore are not sufficient to control image degradation in the restoration and reproduction of the compressed image data.

A down-sampling process with an anti-aliasing filter limiting band can control the generation of aliasing caused by sampling. However, since a low-pass filter is used on an original signal, a high-frequency component is lost from the original signal and an reproduced image is substantially blurred.

The techniques disclosed in Japanese Unexamined Patent Application Publication Nos. 2005-198268 and 2006-5904 perform image compression in a manner free from losing information of the original signal by performing a pixel count decimation process without limiting band. Although the generation of aliasing cannot be controlled, a proper decimation process is appropriately performed in response to the distance of shift of a subject. An observer is thus prevented from viewing a harmonic component by means of a time integration of vision when the observer visually keeps track of a subject during reproduction. The observer thus recognizes less the aliasing distortion caused in the decimation process. However, a process to keep the aliasing distortion fully unrecognizable to the user is difficult to achieve. Part of the aliasing distortion is recognized by the user, and image quality thus further remains to be improved.

It is thus desirable to provide a moving image converting apparatus, a moving image converting method, a moving image reproducing apparatus, a moving image reproducing method and a computer program for performing compression and reproduction of data with an extremely low image quality degradation involved, by determining a stop band frequency of an appropriate anti-aliasing filter applied to a feature of each area of an image, in particular, a movement of a subject, and a change rate at a sampling position in a down-sampling operation, and by performing a data conversion process at an appropriate mode of operation determined for each area.

In accordance with one embodiment of the present invention, a moving image converting apparatus for converting moving image data, includes a block segmentator for segmenting a frame of the moving image data into at least one block, a shift detector for detecting a shift of an image of a subject contained in each of segmented blocks as a block shift distance, a controller for inputting the block shift distance detected by the shift detector and determining a sampling phase change rate ($\Delta P$) as a process parameter to the block in a down-sampling operation, a pre-filter for inputting each block segmented by the block segmentator, and removing from each block a high-frequency component equal to or higher than a stop band frequency (fs) calculated based on an order of a stop target harmonic component (K) determined as a generation condition of super-resolution effect, and a down-sampler for inputting a block with the high-frequency component removed therefrom by the pre-filter and downsampling the input block in accordance with the sampling phase change rate ($\Delta P$) in order to reduce the number of pixels of each block by 1/M times (M being an integer equal to or greater than 2).

The controller may determine the stop target harmonic component order (K) in order to enable the down-sampling operation to be performed with block movement speed range information applied, the down-sampling operation performed within only a subject speed range generating the super-resolution effect, the block movement speed range information generating the super-resolution effect in response to a time integration effect of vision calculated with respect to harmonic component data of each order generated in the 1/M time down-sampling operation, and supply the determined stop target harmonic component order (K) to the pre-filter. The pre-filter may input the stop target harmonic component order (K being an integer falling within a range of 1<K<M), and perform a band limitation process of a low-pass filter in order to remove the high frequency component equal to or higher than the stop band frequency (fs), the stop band frequency (fs) being set so that a harmonic component having a K-th order or higher, of the harmonic components generated in the 1/M time down-sampling operation performed by the down-sampler, is free from overlapping an original signal component.

The controller may determine the stop target harmonic component order K=L+1 with respect to a maximum L allowing a shift distance v0 to be present, the shift distance v0 causing an observer to be unable to observe the harmonic component of an L-th order or lower due to the time integration effect of vision of the observer if the observer visually keeps track of the subject moving at a movement speed within a range of from block shift distance v=v0 (pixels/frame) to v=v0+1 (pixels/frame) with respect to all the harmonic components having an L-th order or lower of the harmonic components generated in the 1/M time down-sampling operation performed on the moving image data by the down-sampler with the sampling phase change rate being zero.

The controller may determine that the observer becomes unable to observe the harmonic component of a k-th order at the block shift distance v if the block shift distance v fails to satisfy condition $(N-\alpha)M/k \leq v \leq (N+\alpha)M/k$ with respect to a predetermined threshold $\alpha$ and any integer N and then determine the stop target harmonic component order K=L+1 based on the determination results.

The controller may calculate the sampling phase change rate ($\Delta P$) of each frame on a per block basis, the sampling phase change rate causing the observer to be unable to observe aliasing distortion due to the time integration effect of vision of the observer if the observer visually keeps track of the moving image at the block shift distance detected by the shift detector, and the aliasing distortion generated by the stop target harmonic components having an order lower than a K-th order of the harmonic components generated in the 1/M time down-sampling operation, and supply the calculated sampling phase change rate ($\Delta P$) to the down-sampler.

The down-sampler may perform the down-sampling operation with a sampling position changed with respect to the block in step with the advancing of frames, in accordance with the sampling phase change rate ($\Delta P$) for each block input from the controller.

The pre-filter may remove from the block a high-frequency component equal to or higher than the stop band frequency (fs) using one of the stop target harmonic component (K) pre-stored on a memory and the stop target harmonic component (K) input from the outside.

In accordance with one embodiment of the present invention, a moving image reproducing apparatus for reproducing moving image converted data, includes an up-sampler for inputting block converted data forming the moving image converted data, and conversion mode related information of each block, and generating image data having the number of pixels equal to the number of pixels present prior to a conversion process by setting a pixel value of a pixel not contained in the block converted data to be zero in accordance with the conversion mode related information, and a post-filter for inputting image data generated by the up-sampler and determining a pixel value of each pixel forming the image data using a pixel value of an adjacent pixel in accordance with the conversion mode related information.

If a block containing a target pixel and an adjacent block are equal to each other in down-sampling direction but different from each other in sampling phase, in a pixel value determination process of pixels forming the image data generated by the up-sampler, the post-filter may perform the pixel value determination process by performing a filtering process using pixel values of pixels in a plurality of blocks equalized in sampling phase after equalizing the block to the adjacent block in sampling phase.

If a block containing a target pixel and an adjacent block are different from each other in sampling frequency in a pixel value determination process of pixels forming the image data generated by the up-sampler, the post-filter may perform the pixel value determination process by performing a filtering process using pixel values of pixels in a plurality of blocks equalized in sampling frequency after equalizing the block to the adjacent block in sampling frequency.

If a block containing a target pixel and an adjacent block are different from each other in down-sampling direction in a pixel value determination process of pixels forming the image data generated by the up-sampler, the post-filter may perform the pixel value determination process by performing a filtering process using pixel values of pixels in a plurality of blocks equalized in down-sampling direction after equalizing the block to the adjacent block in down-sampling direction.

In accordance with one embodiment of the present invention, a moving image converting method for converting moving image data, includes steps of segmenting a frame of the moving image data into at least one block, detecting a shift of an image of a subject contained in each of segmented blocks as a block shift distance, with the detected block shift distance input, controlling determination of a sampling phase change rate ($\Delta P$) as a process parameter to the block in a down-sampling operation, with each segmented block input, removing from each block a high-frequency component equal to or higher than a stop band frequency (fs) calculated based on an order of a stop target harmonic component (K) determined as a generation condition of super-resolution effect, and with a block with the high-frequency component removed therefrom input, downsampling the input block in accordance with the sampling phase change rate ($\Delta P$) in order to reduce the number of pixels of each block by 1/M times (M being an integer equal to or greater than 2).

The step of controlling the determination of the sampling phase change rate ($\Delta P$) may include determining the stop target harmonic component order (K) in order to enable the down-sampling operation to be performed with block movement speed range information applied, the down-sampling operation performed within only a subject speed range generating the super-resolution effect, and the block movement speed range information generating the super-resolution effect in response to a time integration effect of vision calculated with respect to harmonic component data of each order generated in the 1/M time down-sampling operation, and, supplying the stop target harmonic component order (K). The step of removing the high-frequency component may include removing the stop target harmonic component order (K being an integer falling within a range of 1<K<M), and performing a band limitation process of a low-pass filter in order to remove the high frequency component equal to or higher than the stop band frequency (fs), the stop band frequency (fs) being set so that a harmonic component having a K-th order or higher, of the harmonic components generated in the 1/M time down-sampling operation performed by the down-sampler, is free from overlapping an original signal component.

The step of controlling the determination of the sampling phase change rate ($\Delta P$) may include determining the stop target harmonic component order K=L+1 with respect to a maximum L allowing a shift distance v0 to be present, the shift distance v0 causing an observer to be unable to observe the harmonic component of an L-th order or lower due to the time integration effect of vision of the observer if the observer visually keeps track of the subject moving at a movement speed within a range of from block shift distance v=v0 (pixels/frame) to v=v0+1 (pixels/frame) with respect to all the harmonic components having an L-th order or lower of the harmonic components generated in the 1/M time down-sampling operation performed on the moving image data by the down-sampler with the sampling phase change rate being zero.

The step of controlling the determination of the sampling phase change rate ($\Delta P$) may include determining that the observer becomes unable to observe the harmonic component of a k-th order at the block shift distance v if the block shift distance v fails to satisfy condition $(N-\alpha)M/k \leq v \leq (N+\alpha)M/k$ with respect to a predetermined threshold $\alpha$ and any integer N and determining the stop target harmonic component order K=L+1 based on the determination results.

The step of controlling the determination of the sampling phase change rate ($\Delta P$) may include calculating the sampling phase change rate ($\Delta P$) of each frame on a per block basis, the sampling phase change rate ($\Delta P$) causing the observer to be unable to observe aliasing distortion due to the time integration effect of vision of the observer if the observer visually keeps track of the moving image at the block shift distance detected by the shift detector, and the aliasing distortion generated by the stop target harmonic components having an order lower than K of the harmonic components generated in the 1/M time down-sampling operation, and supplying the calculated sampling phase change rate ($\Delta P$).

The step of down-sampling may include performing the down-sampling operation with a sampling position changed with respect to the block in step with the advancing of frames, in accordance with the sampling phase change rate ($\Delta P$) for each input block.

The step of removing the high-frequency component may include removing from the block a high-frequency component equal to or higher than the stop band frequency (fs) using one of the stop target harmonic component (K) pre-stored on a memory and the stop target harmonic component (K) input from the outside.

In accordance with one embodiment of the present invention, a moving image reproducing method for reproducing moving image converted data, includes steps of inputting block converted data forming the moving image converted data, and conversion mode related information of each block, and generating image data having the number of pixels equal to the number of pixels present prior to a conversion process by setting a pixel value of a pixel not contained in the block converted data to be zero in accordance with the conversion mode related information, and inputting generated image data and determining a pixel value of each pixel forming the image data using a pixel value of an adjacent pixel in accordance with the conversion mode related information.

If a block containing a target pixel and an adjacent block are equal to each other in down-sampling direction but different from each other in sampling phase in a pixel value determination process of pixels forming the generated image data, the pixel value determination process may be performed by performing a filtering process using pixel values of pixels in a plurality of blocks equalized in sampling phase after the block is equalized to the adjacent block in sampling phase.

If a block containing a target pixel and an adjacent block are different from each other in sampling frequency in a pixel value determination process of pixels forming the generated image data, the pixel value determination process may be performed by performing a filtering process using pixel values of pixels in a plurality of blocks equalized in sampling frequency after the block is equalized to the adjacent block in sampling frequency.

If a block containing a target pixel and an adjacent block are different from each other in down-sampling direction in a pixel value determination process of pixels forming the generated image data, the pixel value determination process may be performed by performing a filtering process using pixel values of pixels in a plurality of blocks equalized in down-sampling direction after the block is equalized to the adjacent block in down-sampling direction.

In accordance with one embodiment of the present invention, a computer program for converting moving image data, includes steps of segmenting a frame of the moving image data into at least one block, detecting a shift of an image of a subject contained in each of segmented blocks as a block shift distance, with the detected block shift distance input, controlling determination of a sampling phase change rate ($\Delta P$) as a process parameter to the block in a down-sampling operation, with each segmented block input, removing from each block a high-frequency component equal to or higher than a stop band frequency (fs) calculated based on an order of a stop target harmonic component (K) determined as a generation condition of super-resolution effect, and with a block with the high-frequency component removed therefrom input, down-sampling the input block in accordance with the sampling phase change rate ($\Delta P$) in order to reduce the number of pixels of each block by 1/M times (M being an integer equal to or greater than 2).

In accordance with one embodiment of the present invention, a computer program for reproducing moving image converted data, includes steps of inputting block converted data forming the moving image converted data, and conversion mode related information of each block, and generating image data having the number of pixels equal to the number of pixels present prior to a conversion process by setting a pixel value of a pixel not contained in the block converted data to be zero in accordance with the conversion mode related information, and inputting generated image data and determining a pixel value of each pixel forming the image data using a pixel value of an adjacent pixel in accordance with the conversion mode related information.

The computer program of one embodiment of the present invention is supplied in a non-transitory computer-readable storage medium or via a communication medium in a computer readable fashion to a general-purpose computer system that executes a variety of program codes. By supplying such a program in a computer readable fashion, the computer system performs a process responsive to the computer program.

These and other purposes, features and advantages of the present invention will be apparent from the following description of the embodiments of the present invention and the accompanying drawings. The system in this specification refers to a logical set of a plurality of apparatuses and is not limited to the one housed in a single casing.

In accordance with embodiments of the present invention, before the down-sampling operation for reducing the number of samples of the moving image data by 1/M times through a pixel count decimation process, a band limitation process is performed using a low-pass filter having a stop band frequency fs>f/2, where f represents a sampling frequency subsequent to the down-sampling operation. The aliasing distortion generated by high order harmonic components is controlled while the loss of a high-frequency component on an original signal is minimized. As a result, blurring caused in the image at reproduction is controlled.

In accordance with embodiments of the present invention, the band limitation process of the low-pass filter having the stop band frequency fs is performed on the moving image data so that the harmonic components having a K-th order or higher, of the harmonic components generated in the 1/M time down-sampling operation performed on the moving image data by the down-sampler, may not overlap the original signal component. The aliasing distortion caused by the harmonic component of a K-th order or higher is thus controlled.

In accordance with embodiments of the present invention, the down-sampling operation is performed on all or some of blocks with the sampling position shifted along with the advancing of the frames in accordance with the sampling phase change rate appropriately set for the shift distance of each block. A data compression process robust to the shift distance of the subject from area to area is thus performed.

In accordance with embodiments of the present invention, the apparatus calculates the sampling phase change rate that causes the observer to be unable to observe the harmonic component having an order lower than a K-th order with the time integration effect of vision of the observer when the observer visually keeps track of the moving image. The aliasing distortion caused by the harmonic component of an order lower than the K-th order is controlled at reproduction.

In accordance with embodiments of the present invention, the stop target harmonic component order K=L+1 is set with respect to the maximum L that allows a shift distance v0 to be present, the shift distance v0 causing the observer to be unable to observe the harmonic component of an L-th order or lower due to the time integration effect of vision of the observer if the observer visually keeps track of the subject moving at a movement speed within a range of from block shift distance v=v0 (pixels/frame) to v=v0+1 (pixels/frame) with respect to all the harmonic components having an L-th order or lower of the harmonic components generated in the 1/M time down-sampling operation performed on the moving image data by the down-sampler with the sampling phase change rate being zero. This arrangement prevents the sampling phase change rate from frequently changing from block to block, each block forming the image.

In accordance with embodiments of the present invention, a moving image reproducing apparatus includes an up-sampler and an interpolation filter. The up-sampler inputs the converted data for each block forming the moving image converted data and block conversion mode related information and increases the number of samples by M times through zero interpolation in accordance with the conversion mode related information. The interpolation filter interpolates the moving image converted data in accordance with the conversion mode related information. The interpolation filter includes the low-pass filter having the same stop band frequency as the one used in the band limitation process of the pre-filter of the moving image converting apparatus. As a result, the user can view a moving image approximately equal to the original image thereof with blurring and aliasing distortion reduced.

BRIEF DESCRIPTION OF THE DRAWINGS

FIGS. 5A and 5B illustrate a filtering operation performed by a pre-filter in the moving image converting apparatus;

FIGS. 16A-16C illustrate a filtering method of the down-sampling operation performed on adjacent blocks.

DESCRIPTION OF THE PREFERRED EMBODIMENTS

A method and apparatus for converting a moving image, a method and apparatus for reproducing a moving image, and a computer program in accordance with one embodiment of the present invention are described below with reference to the drawings.

Figure 1:
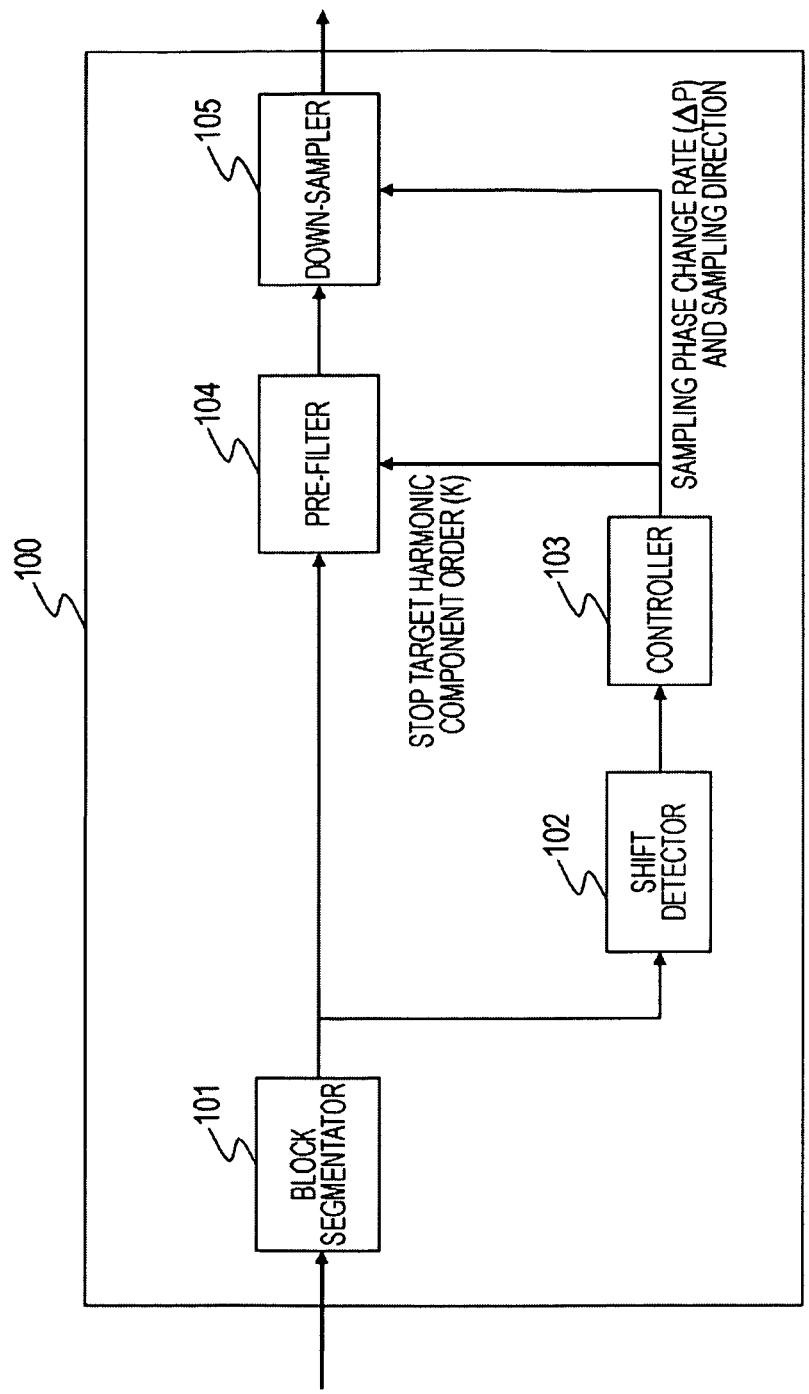
FIG. 1 is a block diagram illustrating a moving image converting apparatus in accordance with one embodiment of the present invention.

FIG. 1 illustrates a moving image converting apparatus 100 in accordance with one embodiment of the present invention. The moving image converting apparatus 100 converts a moving image using a band limitation process and super-resolution effect. The moving image converting apparatus 100 thus reduces an amount of data without a user to recognize an image degradation due to the data amount reduction.

The super-resolution effect is a vision effect in accordance with which the user views the sum of a plurality of images within a predetermined period of time. Humans have a sensory memory function. Once a human senses a stimulus, he or she memorizes for a predetermined period of time subsequent to the removal of the stimulus in accordance with sensory memory. Many reports state that the predetermined period of time falls within a range of from 10 ms to 200 ms. This function is also referred to as iconic memory or visual persistence, and is described in "Vision Information Handbook", published by Vision Science Society of Japan, pp. 229-230. The super-resolution effect is believed to be caused by a complex combination of time integration function and sensory memory of vision of human.

The moving image converting apparatus 100 of FIG. 1 converts a moving image using the super-resolution effect caused by the time integration function. The moving image converting apparatus 100 compresses and thus reduces data in a manner such that an observer is free from recognizing image degradation.

A block segmentator 101 segments each frame of an input moving image into blocks as a segmented area of predetermined pixels and then supplies the blocks to each of a shift detector 102 and a pre-filter 104. The shift detector 102 detects a shift distance of each block supplied from the block segmentator 101, and then supplies the detected shift distance to the controller 103. In response to the shift distance of each block supplied from the shift detector 102, the controller 103 calculates an order K of a stop target high frequency component, and then supplies the stop target harmonic component order K to the pre-filter 104.

Although the stop target harmonic component order K will be described later in detail, the stop target harmonic component order K is briefly discussed here. The moving image converting apparatus 100 of FIG. 1 down-samples an input image, i.e., performs a decimation process on the input image, thereby reducing the input image in data amount into a compressed image. The compressed image is then output. Let M represent a down-sampling rate (decimation rate), and the input data is reduced to an amount of 1/M of the original amount. This operation is referred to a 1/M time down-sampling operation. When the 1/M time down-sampling operation is performed, harmonic waves (components) ranging from a first order to (M−1)-th order are generated. Each harmonic component overlaps the original signal component in a frequency domain, thereby causing aliasing distortion.

As a result, the user may perceive an image degradation due to the aliasing distortion caused in the image when the image is restored and reproduced from the compressed image. In the moving image converting apparatus of one embodiment of the present invention, the pre-filter 104 performs a band limitation operation to remove a harmonic component of a predetermined order or higher and the down-sampler 105 down-samples the data with the harmonic component removed therefrom, thereby reducing the amount of data of the image. The moving image converting apparatus 100 thus generates compressed image data. In this case, a removal level of the harmonic component is the stop target harmonic component order K. A determination method of the stop target harmonic component order K and the process of the pre-filter 104 will be described in detail later.

The controller 103 calculates a sampling phase change rate of each block in accordance with the shift distance of each block supplied from the shift detector 102. The pre-filter 104 performs the band limitation operation on each block supplied from the block segmentator 101 in accordance with the stop target harmonic component order K supplied from the controller 103, i.e., removes the harmonic component contained in each block in accordance with the stop target harmonic component order K. The resulting band-limited block is then supplied to the down-sampler 105. The down-sampler 105 performs the down-sampling operation on the band-limited block data supplied from the pre-filter 104, in accordance with the sampling phase change rate supplied from the controller 103.

The moving image converting apparatus 100 of FIG. 1 is described in detail.

The block segmentator 101 is described first in detail. The block segmentator 101 segments each frame of the input moving image into at least one block. In this case, it is not necessary that the blocks be equal to each other in size. However, when the 1/M down-sampling (decimation) operation (M being a positive integer) is performed, the aspect ratio of horizontal to vertical pixels is preferably an integer multiple of M. For example, if a ¼ down-sampling operation (M=4) is performed, the size of each block is preferably 4×4 pixels, 8×8 pixels or the like.

The shift detector 102 is then described below. The shift detector 102 detects the shift distance of each block supplied from the block segmentator 101 in accordance with any method (for example, a block matching method). For example, if the shift distance of a block in a P-th frame is detected through the block matching, a corresponding block in a (P−1)-th frame is used as a reference block to detect the shift distance (for example, a motion vector) between the frames. When the shift distance is detected using the block matching, the shift detector 102 also references the current frame and other frames. The shift distance is supplied in the form of a motion vector to the controller 103. Alternatively, the shift distance may be supplied to the controller 103 in a format different from the motion vector if information identifying the shift distance in a X direction and a Y direction of the block is supplied.

The pre-filter 104 and the down-sampler 105 are described in detail before the discussion of the controller 103.

The pre-filter 104 is discussed first. The pre-filter 104 performs the band limitation operation to remove the harmonic component contained in a block image in accordance with the stop target harmonic component order K. Filters may be used for the band limitation. Any type of filter may be used as long as the filter performs a harmonic component removal operation. For example, a finite-duration impulse response (FIR) filter is used herein to limit band.

The stop band frequency fs of the filter is determined based on the stop target harmonic component order K supplied from the controller 103. The harmonic components equal to or higher than the stop band frequency fs are removed. The stop target harmonic component order K may be different from block to block or may remain unchanged regardless of blocks. When the 1/M time down-sampling operation is performed, the harmonic components ranging from the first order to the (M−1)-th order are generated. The harmonic components overlap the original signal component in frequency, thereby causing the aliasing distortion. By performing the band limitation prior to the down-sampling, the aliasing distortion generated by the harmonic components being equal to or higher than a predetermined order are controlled.

Figure 2A:
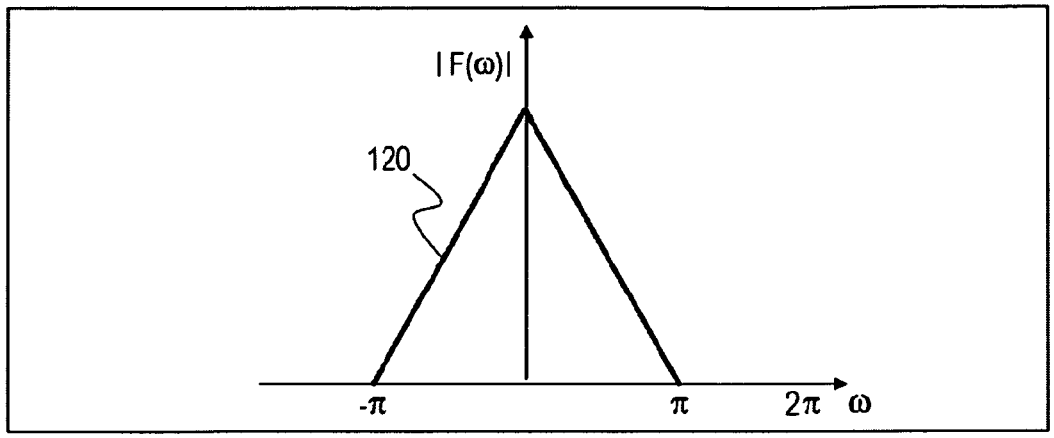
FIGS. 2A-2C illustrate the principle that explains how an aliasing distortion caused by a harmonic component of a particular order or higher is controlled by a band limitation performed prior to a down-sampling operation.
Figure 2B:
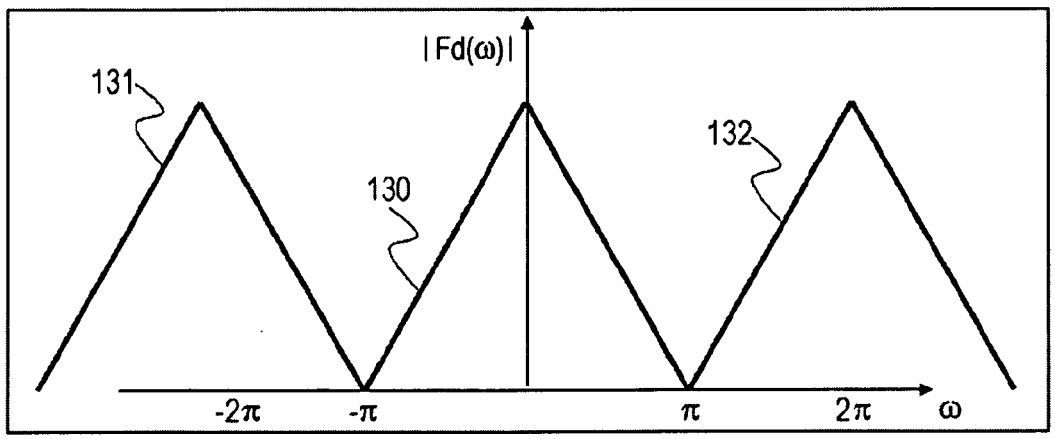
Figure 2C:
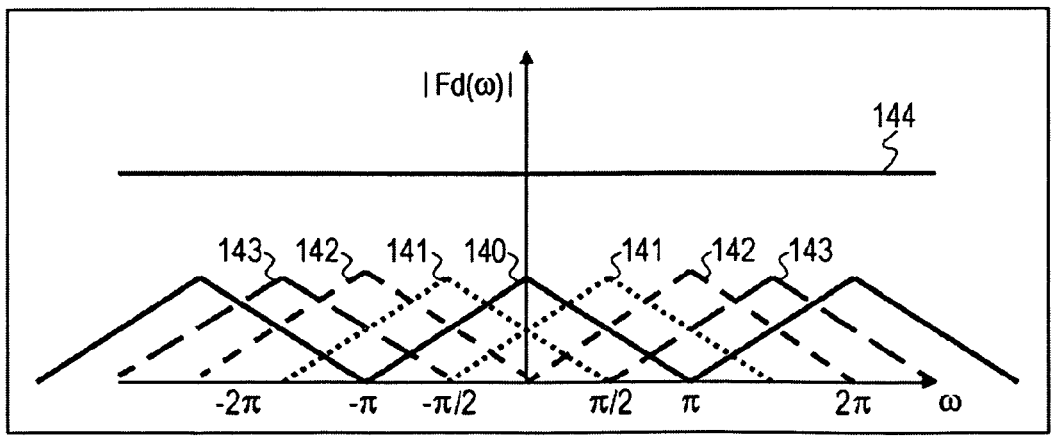

FIGS. 2A-2C illustrate the principle of controlling the aliasing distortion generated by the harmonic components being equal to or higher than a predetermined order by performing the band limitation prior to the down-sampling operation.

A one-dimensional analog signal f(x) with the band thereof limited by 0.5 Hz may now be sampled by 1/T (Hz) into a one-dimensional discrete signal fd(n). The one-dimensional discrete signal fd(n) is obtained using the one-dimensional analog signal f(x) with the band thereof limited by 0.5 Hz as described in equation (1):

$$f_d(n) = \sum_{k=-\infty}^{\infty} f(kT)\delta(n-kT) \quad (1)$$

where T represents sampling intervals, and δ(t) represents a delta function. The delta function δ(t)=1 for t=0, and δ(t)=0 for other t values. If the one-dimensional analog signal f(x) is a one-dimensional subject, the one-dimensional discrete signal fd(n) is considered a one-dimensional image signal obtained by photographing that subject.

To know characteristics of the one-dimensional discrete signal fd(n) in the frequency domain, one-dimensional discrete signal fd(n) is Fourier transformed. Let f(ω) represent a Fourier transformed expression of f(x), a Fourier transformed expression Fs(ω) of the discrete signal fs(n) is expressed in equation (2):

$$F_d(\omega) = \frac{1}{T} \sum_{r=-\infty}^{\infty} F(\omega - 2\pi r/T) \quad (2)$$

where ω represents an angular frequency.

FIG. 2A illustrates frequency characteristics |F(ω)| of the one-dimensional analog signal f(x) with the band thereof limited by 0.5 Hz. Since the band is limited by 0.5 Hz (ω=π), frequency components equal to or higher than ω=π are not contained. FIG. 2B illustrates frequency characteristics |F(ω)| of the one-dimensional discrete signal fd(n) sampled at a sampling interval T=1. As understood from equation (2), the same waveform is repeated with a 2π period.

As shown in FIG. 2B, data 130 corresponds to a term of r=0, data 131 corresponds to term of r=−1, and data 132 corresponds to a term of r=1.

The sample count of the one-dimensional discrete signal fd(n) may be reduced to one-quarter by the down-sampling operation. Sampling interval T is changed from T=1 in FIG. 2B to T=4. The frequency characteristics are then obtained by substituting T=4 in equation (2). FIG. 2C illustrates frequency characteristics |Fd(ω)| with T=4.

FIG. 2C illustrates that the period of the waveform becomes one-quarter (¼). As shown in FIG. 2C, data 141 denoted by a broken-line waveform is obtained from terms of r=±1, and is referred to as a first harmonic component. Data 142 denoted by a short-dash chained line waveform is obtained from terms of r=±2, and is referred to as a second harmonic component. Data 143 denoted by a long-dash chained line waveform is obtained from terms of r=±3, and is referred to as a third harmonic component. The down-sampling operation for reducing the sample count to one-quarter generates the first to third harmonic components which are not present in FIG. 2B.

The frequency characteristics |Fd(ω)| of the one-dimensional discrete signal fd(n) with the sampling interval T=4 are the sum of these components, and are a waveform 144 of FIG. 2C. The waveform 144 is quite different from the waveforms of FIG. 2B. This is referred to the aliasing distortion. The aliasing distortion is generated when the harmonic components overlap the original signal component because of an insufficiency of the sampling frequency with respect to the band of the original signal.

FIGS. 3A and 3B and FIGS. 4A and 4B illustrate that the aliasing distortion is reduced by limiting the band of the original signal prior to the down-sampling operation.

Figure 3A:
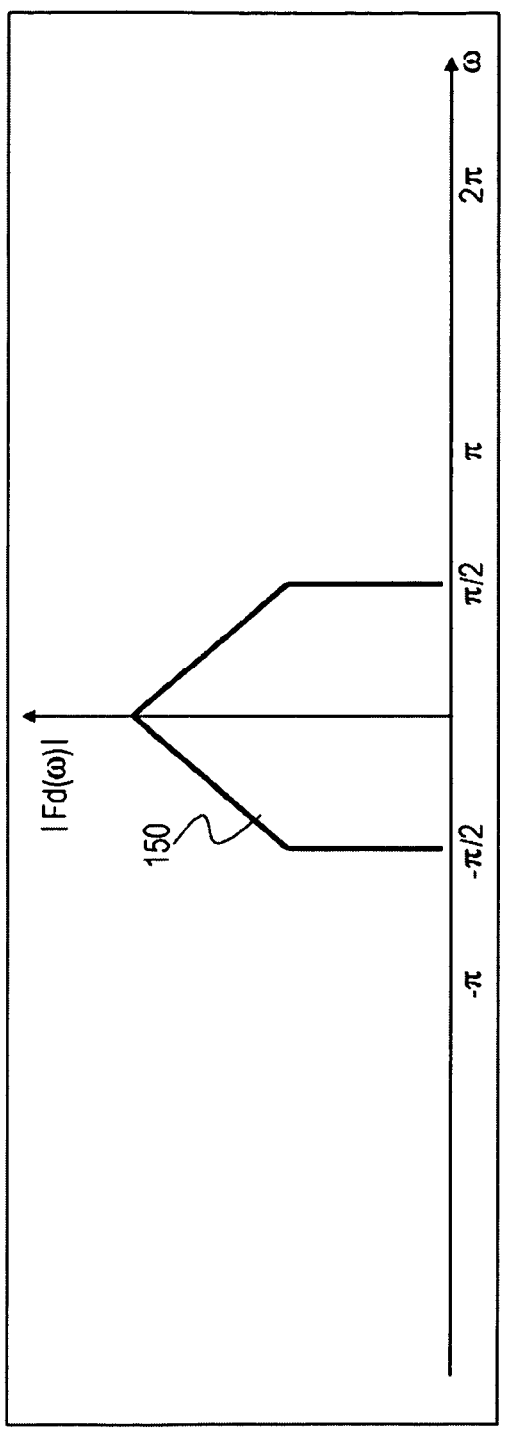
FIGS. 3A and 3B illustrate the principle that explains how the aliasing distortion caused by the harmonic component of being equal to or higher than the particular order is controlled by the band limitation performed prior to the down-sampling operation.
Figure 3B:
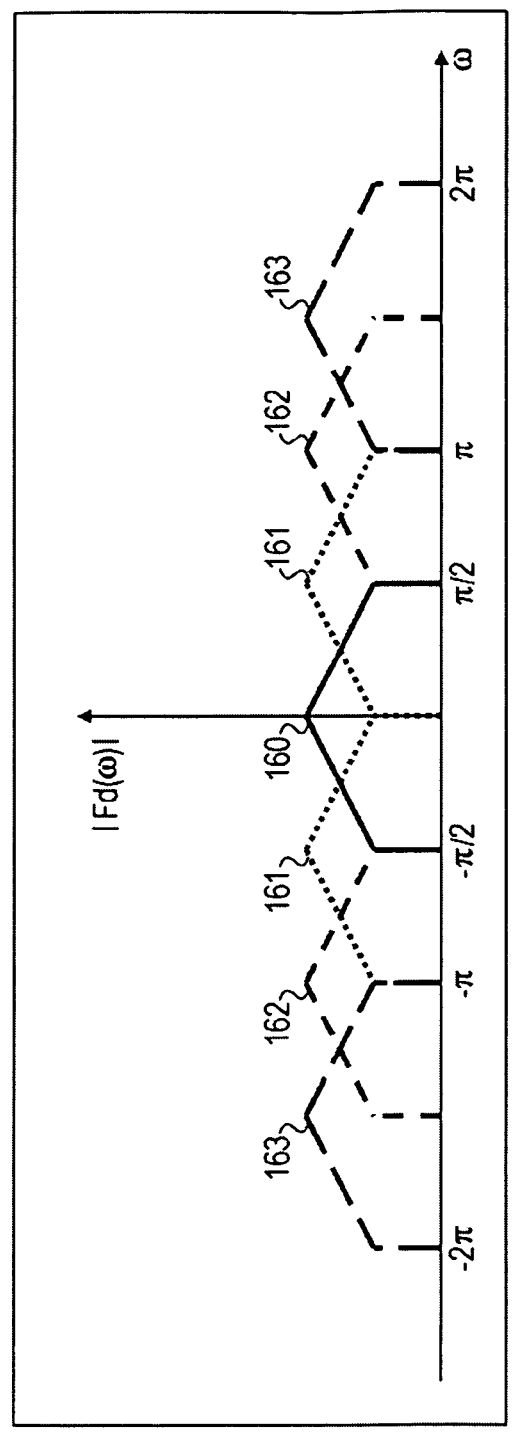

FIG. 3A illustrates data 150 that is obtained by performing on the signal of FIG. 2A the band limitation operation with a stop band frequency (cutoff frequency) of 0.25 Hz using an ideal low-pass filter. FIG. 3B illustrates harmonic components having undergone the ¼ time down-sampling operation. As shown in FIG. 3B, a harmonic component overlapping original signal component data 160 is only first harmonic data 161. Second harmonic data 162 and third harmonic data 163 do not overlap the original signal component data 160. The harmonic component causing the aliasing distortion is only the first harmonic 161.

Figure 4A:
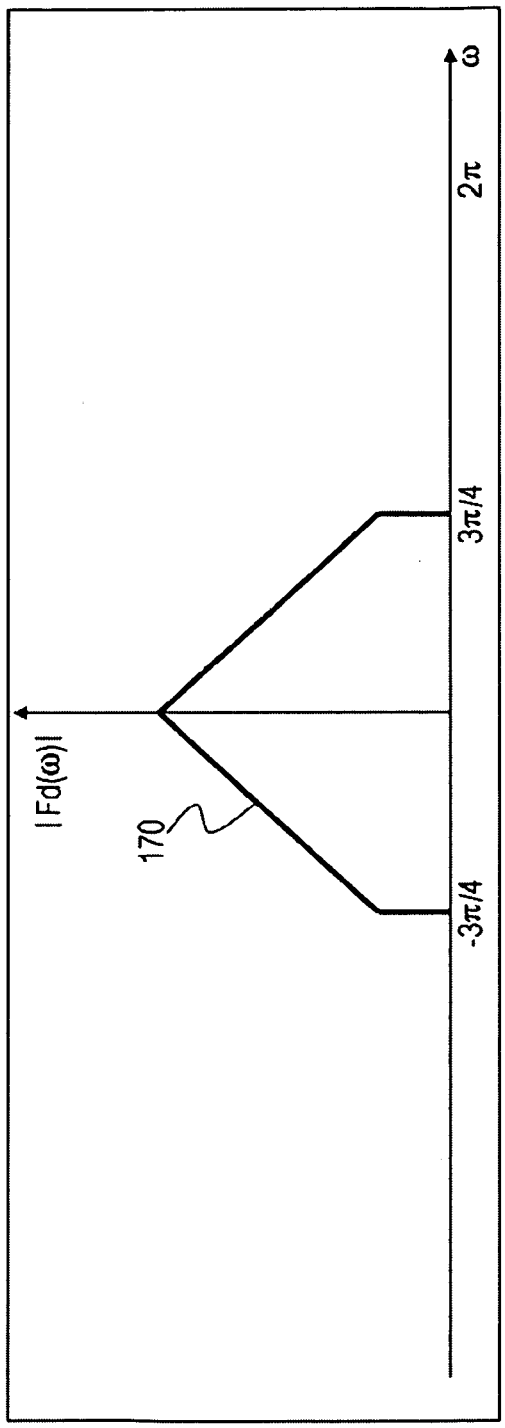
FIGS. 4A and 4B illustrate the principle that explains how the aliasing distortion caused by the harmonic component of being equal to or higher than the particular order is controlled by the band limitation performed prior to the down-sampling operation.
Figure 4B:
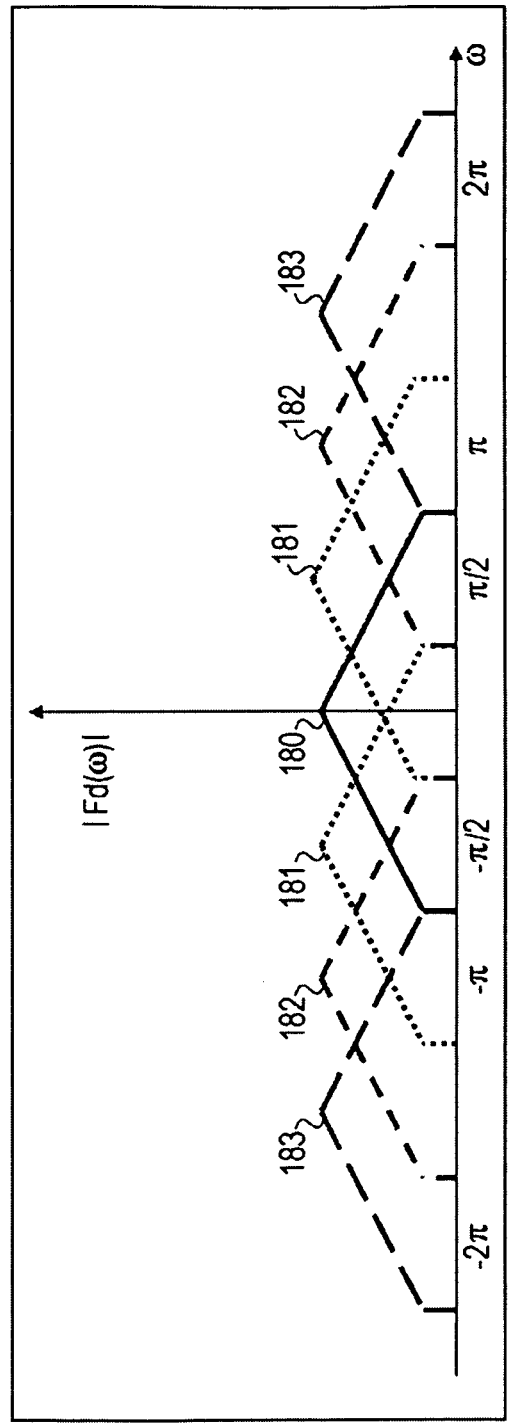

FIG. 4A illustrates data 170 that is obtained by performing on the signal of FIG. 2A the band limitation operation with a stop band frequency (cutoff frequency) of 0.375 Hz using an ideal low-pass filter. FIG. 4B illustrates harmonic components having undergone the ¼ time down-sampling operation. As shown in FIG. 4B, harmonic components overlapping original signal component data 180 is first harmonic data 181 and second harmonic data 182. Third harmonic data 183 does not overlap the original signal component data 180. The harmonic components causing the aliasing distortion is the first harmonic 181 and the second harmonic 182.

The appropriate setting of the stop band frequency to the band limitation prior to the down-sampling operation prevents the aliasing distortion from being generated by the harmonic components of a predetermined order or higher subsequent the down-sampling operation. With M=4 and the band of the original signal limited to 0.5 Hz, the aliasing distortion due to the second or higher harmonics is controlled by setting the stop band frequency of the low-pass filter to 0.25 Hz, and the aliasing distortion due to the third or higher harmonics is controlled by setting the stop band frequency of the low-pass filter to 0.375 Hz.

Generally, in order to control the aliasing distortion due to the harmonic components of K-th or higher order in the 1/M time down-sampling operation with the original signal band limited to g (Hz), the stop band frequency fs is set as expressed in equation (3):

$$fs = Kg/M \quad (3)$$

The pre-filter 104 in the moving image converting apparatus 100 of FIG. 1 calculates the stop band frequency fs in accordance with equation (3) based on the stop target harmonic component order K supplied from the controller 103. The pre-filter 104 then limits the band of the moving image using the low-pass filter having the stop band frequency fs. The stop band frequency fs is set to be a lower limit frequency of a harmonic to be cut off. The stop band frequency fs is set to be equal to or lower than a value calculated in accordance with equation (1) so that the aliasing distortion caused by the harmonic component of K-th order or higher is prevented from being generated. The pre-filter 104 performs the band limitation using the low-pass filter having the stop band frequency fs equal to or lower than the value calculated by equation (1).

The band limitation process of the pre-filter 104 is specifically described below. Any type of filter may be used for band limitation. For example, an FIR filter having nine taps performing the band limitation operation is described below.

The ¼ time down-sampling operation with a down sampling rate (decimation rate) M being 4 is now performed, and the size of the block going to be band-limited is 4×4 pixels. When the controller 103 provides the stop target harmonic component order K for each block and a down sampling direction (vertical or horizontal direction), the pre-filter 104 can calculate the stop band frequency of the band-limiting filter in accordance with equation (3) and then band-limits the block.

For example, the original signal is band-limited by g=0.5 (Hz) and the stop target harmonic component order K provided by the controller 103 is K=2. To control the aliasing distortion caused by the second harmonic component or higher harmonic component in the ¼ time down-sampling operation, the stop band frequency fs is calculated in accordance with equation (3) as follows:

$$fs = Kg/M$$

$$= 2 \times 0.5/4$$

$$= 0.25, \text{thus,}$$

$$fs = 0.25 \text{ Hz.}$$

Impulse response of the FIR filter having nine taps with a stop band frequency fs of 0.25 Hz is calculated using any filter design method, and the impulse response may be [A0, A1, A2, A3, A4, A5, A6, A7, A8]. The impulse response [A0, A1, A2, A3, A4, A5, A6, A7, A8] is convoluted with a pixel value in one of a vertical direction and a horizontal direction to complete filtering operation. If the down-sampling operation is performed in a horizontal direction, the convolution (filtering) is performed in a horizontal direction.

The filtering operation with the stop band frequency fs=0.25 Hz is described below with reference to FIGS. 5A and 5B. FIG. 5A illustrates three blocks 201-203 input from the block segementator 101 to the pre-filter 104. Each of the blocks 201-203 includes 4 pixels by 4 pixels.

FIG. 5B illustrates a filtering operation of the FIR filter having nine taps performed on pixels (t00)204. The FIR (finite impulse response) filter having nine taps used as the pre-filter 104 for band limiting provides an impulse response 206 including A0-A8 of FIG. 5B.

When the FIR filter having nine taps is used to filter the pixel (t00)204, pixel values of four pixels ahead of the pixel (t00)204 and four pixels behind the pixel (t00)204 in a horizontal direction are retrieved. A total of nine units of image data 205 are thus filter processed. The nine units of image data 205 includes a total nine pixels, namely, pixels s00-s03 in the block 201, pixels t00-t03 in the block 202, and a pixel u00 in the block 203.

Pixel data 205 of a total of nine pixels, including the pixel t00 and the four pixels to the right of and the four pixels to the left of the pixel t00, and the impulse response 206 are multiplied and then summed. The multiplication and summation results are adopted as a pixel value (t'00)207 of a pixel 204 subsequent to band limitation. The pre-filter 104 thus obtains pixel values of remaining pixels forming the block, and outputs the results to the down-sampler 105.

As described with reference to FIGS. 5A and 5B, the pre-filter 104 performs the process thereof across blocks. The example of FIGS. 5A and 5B is the filtering operation using the FIR filter having nine taps. The nine pixels including a target pixel are processed. If a filter with a longer tap length is used, pixel values of pixels in a block other than the adjacent blocks may be used.

The pre-filter 104 calculates the stop band frequency fs in accordance with equation (3) using the stop target harmonic component order K supplied from the controller 103 and performs the band limiting operation using the low-pass filter having the stop band frequency fs. For example, the image signal input to the moving image converting apparatus 100 may be band-limited by g (Hz), and then 1/M time down-sampled by the down-sampler 105. In such a case, the pre-filter 104 calculates the stop band frequency fs in accordance with equation (3) (fs=Kg/M) in response to the stop target harmonic component order K determined by the controller 103, and performs the pixel value conversion process discussed with reference to FIGS. 5A and 5B using the low-pass filter having the stop band frequency fs. The pre-filter 104 thus generates a band limited image with a high-frequency component removed therefrom, and then outputs the resulting image to the down-sampler 105.

In the above discussion, the pre-filter 104 calculates the stop band frequency fs in accordance with equation (3) in response to the stop target harmonic component order K supplied from the controller 103 and performs the band limitation operation using the low-pass filter having the stop band frequency fs. Alternatively, the pre-filter 104 may remove the harmonic components being equal to or higher than the stop band frequency fs, using the stop target harmonic component order K stored on the moving image converting apparatus 100 or the stop target harmonic component order K supplied from the outside.

The down-sampling operation performed by the down-sampler 105 is described below. The down-sampler 105 performs a pixel count reduction operation to the band-limited block data supplied from the pre-filter 104. The pixel count reduction operation is performed based on the sampling phase change rate ($\Delta P$) supplied from the controller 103. The sampling phase change rate $\Delta P$ is an integer falling within a range of 1 to (M−1) if the down sampling rate (decimation rate) is M, in other words, if the 1/M time down-sampling operation is performed. The sampling phase change rate ($\Delta P$) represents a change in the sampling phase in each frame. The sampling phase P of a t-th frame is expressed in equation (4):

$$P = t\Delta \% M \quad (4)$$

where % represents a remainder calculation.

For example, if the down-sampling rate (decimation rate) M=4, and the sampling phase change rate $\Delta P=1$, the sampling phase P of a t-th frame becomes as listed below:

P=0 at t=0
P=1 at t=1
P=2 at t=2
P=3 at t=3
P=0 at t=4

If the down-sampling rate (decimation rate) M=4, and the sampling phase change rate $\Delta P=3$, the sampling phase P of a t-th frame becomes as listed below:

P=0 at t=0
P=3 at t=1
P=2 at t=2
P=1 at t=3
P=0 at t=4

In this way, the sampling phase P changes with a four-frame period.

For example, let (x,y) represent coordinates of a pixel at the top left corner of the block of B pixels by B pixels, and the coordinates of a pixel having a pixel value remaining through the down-sampling operation in a horizontal direction are expressed in equation (5):

$$(x+P+MW, y+H) \quad (5)$$

where W and H are any integer. All pixels satisfying equation (5) in the block remain.

The coordinates of a pixel having a pixel value remaining through the down-sampling operation in a vertical direction are expressed in equation (6):

$$(x+W, y+P+MH) \quad (6)$$

Information as to whether the down-sampling operation is performed in a horizontal direction or a vertical direction is supplied to the controller 103. The controller 103 determines the down sampling direction in response to the direction of a motion vector on a per block basis input from the shift detector 102. The controller 103 supplies the determined direction information together with the sampling phase change rate ΔP to the down-sampler 105.

FIGS. 6A-6H illustrate an example of the down-sampling operation performed by the down-sampler 105. In the down-sampling operation of FIGS. 6A-6H, each block is 4 pixels by 4 pixels, the down-sampling rate M is 4, and the sampling phase change rate ΔP is 1.

The pixel values of the pixels are respectively represented by s00 through s33.

FIGS. 6A-6D illustrate a horizontal down-sampling operation and FIGS. 6E-6H illustrate a vertical down-sampling operation.

Figure 6A:
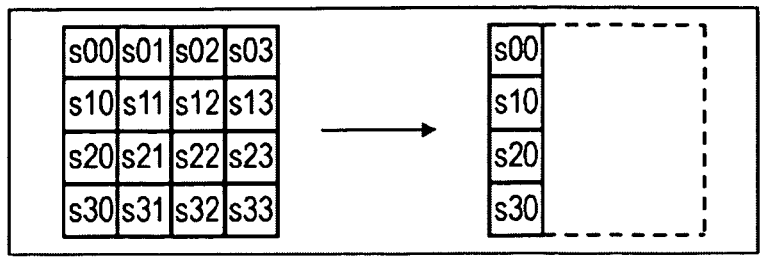
FIGS. 6A-6H illustrate the down-sampling operation performed a down-sampler.
Figure 6B:
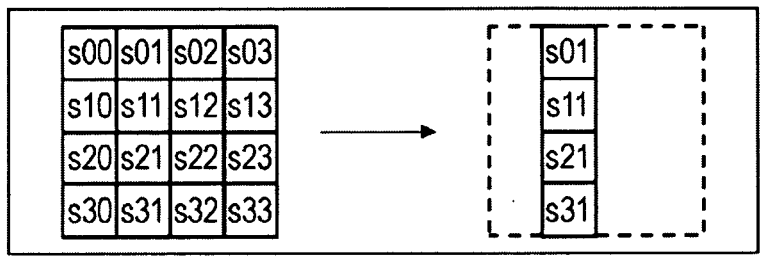
Figure 6C:
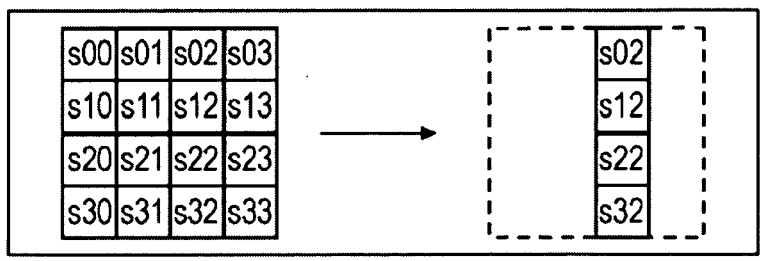
Figure 6D:
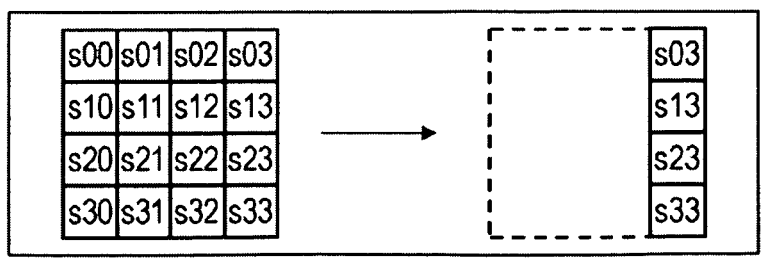
Figure 6E:
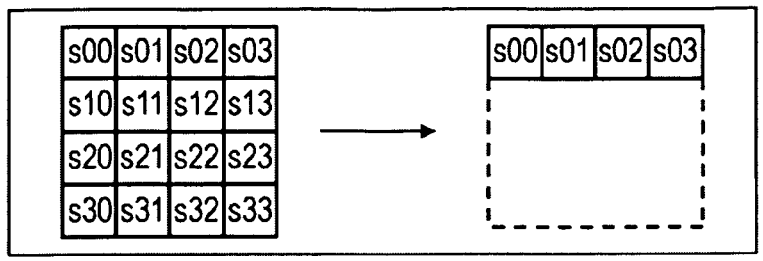
Figure 6F:
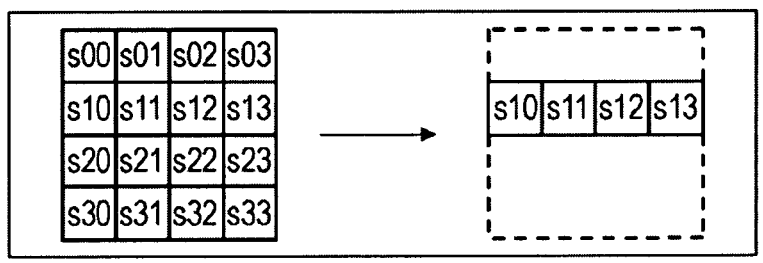
Figure 6G:
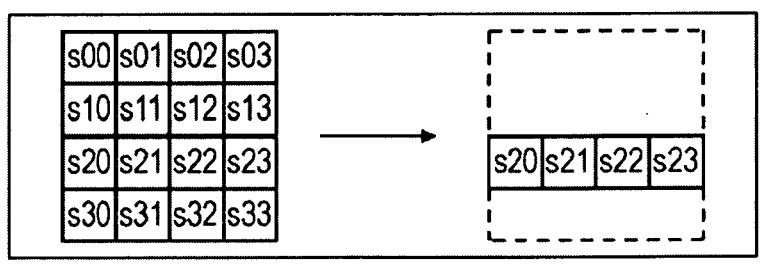
Figure 6H:
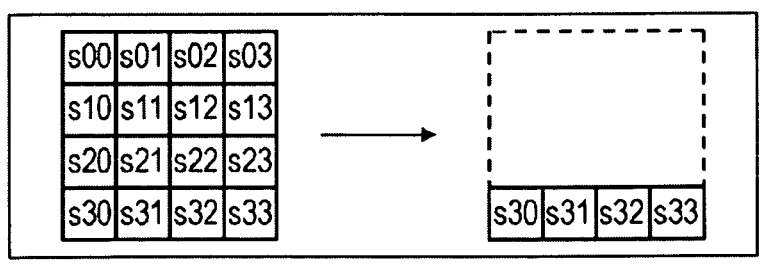

FIGS. 6E-6H illustrate the blocks at the positions in four consecutive frames in the horizontal down-sampling operation. The blocks of 4 pixels by 4 pixels illustrated on the left portions of FIG. 6A are block data filter processed by the pre-filter 104. The right block indicated by an arrow-headed line is selected through the down-sampling operation. Only four pixels of the 16 pixels in the block are selected and the remaining pixels are discarded. In other words, the ¼ time down-sampling operation has been performed.

FIGS. 6A-6D also denote the blocks at the same position in the four consecutive frames. In a leading frame of FIG. 6A, only the leftmost image data remains with the rest of the image data discarded. In a second frame of FIG. 6B, only second image data from the left remains with the rest of the image data discarded. In a third frame of FIG. 6C, only third image data from the left remains with the rest of the image data discarded. In a fourth frame of FIG. 6D, only fourth image data from the left remains with the rest of the image data discarded. The down-sampling operation has thus been preformed.

With the sampling phase change rate ΔP=1 in the example of FIGS. 6A-6D, the sampling phases P at t-th are listed as below:
P=0 at (A) t=0
P=1 at (B) t=1
P=2 at (C) t=2
P=3 at (D) t=3.

The data in the block is thus reduced to one-quarter through the down-sampling operation.

FIGS. 6E-6H illustrate the blocks at the same position in consecutive four frames in the vertical down-sampling operation. In a top frame of FIG. 6E, only top image data remains with the rest of the image data discarded. In a next frame of FIG. 6F, second image data from the top remains with the reset of the image data discarded. In a frame of FIG. 6G, third image data from the top remains with the rest of the image data discarded. In a frame of FIG. 6H, fourth image data remains from the top remains with the rest of the image data discarded.

With the sampling phase change rate ΔP=1 in the example of FIGS. 6E-6H, the sampling phases P at t-th are listed as below:
P=0 at (E) t=0
P=1 at (F) t=1
P=2 at (G) t=2
P=3 at (H) t=3.

The data in the block is thus reduced to one-quarter through the down-sampling operation.

In the moving image converting apparatus 100, the down-sampler 105 performs the down-sampling operation (pixel count decimation process) subsequent to the band limitation operation of the pre-filter 104. The data amount of the moving image is thus reduced.

The process of the controller 103 is described below. The controller 103 receives the shift distance (such as a motion vector) on a per block basis, and then determines process parameters. The process parameters include the stop target harmonic component order K to be supplied to the pre-filter 104, and the sampling phase change rate ΔP and the sampling direction to be supplied to the down-sampler 105. The controller 103 supplies the resulting parameters to the pre-filter 104 and the down-sampler 105.

The controller 103 determines these parameters that allow the down-sampling operation to be performed taking advantage of the super-resolution based on the sensory integration effect of humans in a manner such that human users may not perceive image degradation.

The principle of using the super-resolution phenomenon based on the sensory integration effect of humans in order for humans not to recognize image degradation is described below.

A technique of generating a high-resolution image from a plurality of low-resolution images different in spatial sampling positions is known as a super-resolution process. The interpretation of a super-resolution image in a spatial frequency domain is disclosed in detail in Japanese Unexamined Patent Application Publication No. 8-336046, for example. The principle and discussion of the super-resolution effect based on human vision are disclosed in detail in Japanese Unexamined Patent Application Publication No. 2005-198268. The generation condition of the super-resolution effect disclosed in Japanese Unexamined Patent Application Publication No. 2005-198268 is discussed below.

An observer now visually keeps track of a subject in a moving image. According to Bloch's law, humans perceive light presented for a short period of time by integrating light. If a moving image is displayed at a sufficiently high frame rate, a video perceived by an observer results from integrating all consecutively displayed frames. Sample positions in all frames to be integrated are summed with the positions shifted in response to the shift distance of the moving subject. A shift amount φ(t) of the sample position at frame number t is described using a shift v (in pixels) of the subject per frame in accordance with equation (7):

$$\phi(t) = \frac{vt}{X} \qquad (7)$$

where X represents sampling intervals.

Since the shift of the sampling position indicates a relative shift from the sampling position in a first frame, φ(0)=0. A signal $f_s(x)$ that is obtained by discretizing an original signal f(x) with the sampling intervals X is described using equation (8):

$$f_s(x) = \sum_{k=-\infty}^{\infty} f(kX)\delta(x - kX) \qquad (8)$$

$F_s(\omega)$ obtained by Fourier transforming equation (8) is described in equation (9):

$$F_s(\omega) = \frac{1}{X} \sum_{k=-\infty}^{\infty} F(\omega - k\omega_s) \tag{9}$$

where $F(\omega)$ is Fourier transform results of the original signal. The term at k=0 is the original signal component, and the other terms correspond to k-th order harmonic component. Equation (10) is the Fourier transform results $F_{s\phi(t)}(\omega)$ of a signal that is obtained by discretizing similarly the original signal and then shifting the discretized signal by $\phi(t)$:

$$F_{s\phi(t)}(\omega) = \frac{1}{X} \sum_{k=-\infty}^{\infty} F(\omega - k\omega_s) e^{-j2\pi k \phi(t)} \tag{10}$$

Equation (10) is the Fourier transform results of the discretized signal at a frame number t. The integration of T frames is now considered from the vision system of the observer. The Fourier transform results $I(\omega)$ of the video actually observed by the observer are the sum of equation (10) with respect to different t, and is represented in the following equation (11):

$$\begin{aligned} I(\omega) &= \sum_{t=0}^{T} F_{s\phi(t)}(\omega) \\ &= \frac{1}{X} \sum_{t=0}^{T} \sum_{k=-\infty}^{\infty} F(\omega - k\omega_s) e^{-j2\pi k \phi(t)} \\ &= \frac{1}{X} \sum_{k=-\infty}^{\infty} \left\{ F(\omega - k\omega_s) \sum_{t=0}^{T} e^{-j2\pi k \phi(t)} \right\} \end{aligned} \tag{11}$$

If the following equation (12) holds in equation (11) with respect to all k (k≠0), only the original signal component with k=0 remains:

$$\sum_{t=0}^{T} e^{-j2\pi k \phi(t)} = 0 \tag{12}$$

The following equation then holds and the observer perceives the original signal.

$$I(\omega) \propto F(\omega)$$

If a predetermined value is set to the sampling interval X with the number of frames T integrated by the observer known, the value of the left side of equation (12) depends on the movement speed v of the subject.

If the subject moves as a speed satisfying equation (12), the aliasing distortion caused by discritizing the signal at the sampling interval X is all canceled by the sensory integration process of the observer. The observer can thus recognize the original signal. For example, a subject moves at a speed satisfying equation (12) at the sampling interval X=4. Even if the pixel count forming the subject is down-sampled in the moving direction, no image degradation is recognized by the observer. As a result, data amount is reduced. In practice, certain degree of super-resolution phenomenon takes even if equation (12) is not fully satisfied. Almost no image degradation is perceived by the observer.

Figure 7:
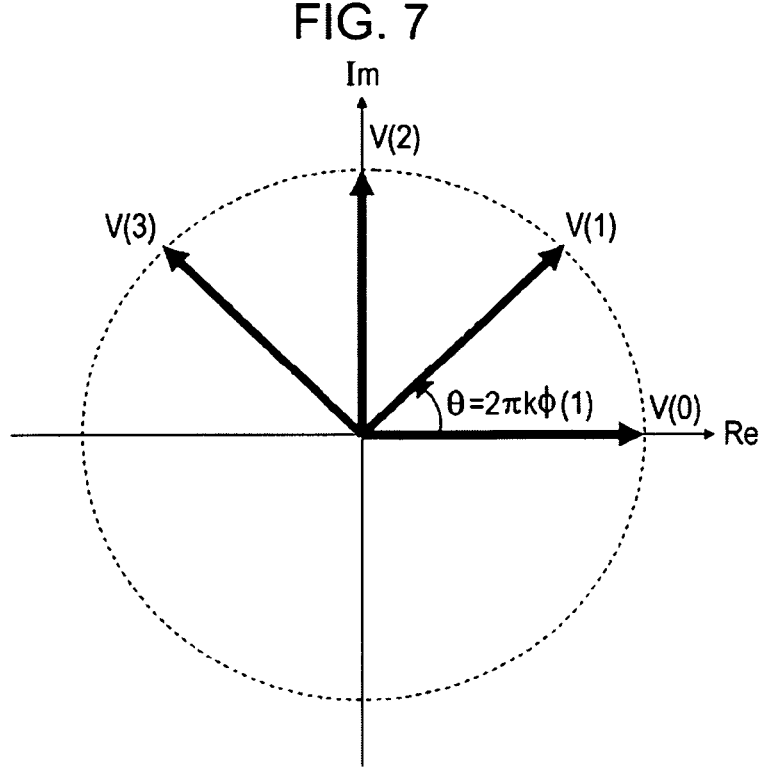
FIG. 7 illustrates a principle of how super-resolution phenomenon occurs.

Equation (12) is considered as the sum of vectors V(t) on a complex plane if $V=e^{-j2\pi k\phi(t)}$ is substituted. In this case, each vector rotates on the complex plane with an angle of rotation of $\theta=2\pi k\phi(1)$. FIG. 7 illustrates how such a vector rotates.

If the angle of rotation θ is set to an appropriate value, the sum of vectors within the integration time of the vision system becomes almost zero and the super-resolution image takes place. More specifically, the condition of equation (12) depends on not only the movement speed of the subject but also the integration time of the vision system. The integration time of the vision system is known to change depending on environment. Even if the integration time of the vision system is not changed depending environment, it is difficult to measure accurately the integration time. The determination of range of the movement speed of the subject satisfying the condition of equation (12) is difficult. It is known from visual perception experiments that the higher the frame rate, i.e., the more the number of images to be integrated, the shorter the sampling interval X, and the more the decimation rate becomes. The super-resolution is more likely to take place. The condition of the super-resolution generation then depends on the subject speed, and is related as described in equation (13):

$$2\pi n + \sigma \leq 2\pi k\phi(1) \leq 2\pi(n+1) - \sigma \tag{13}$$

where n represents an integer.

Figure 8:
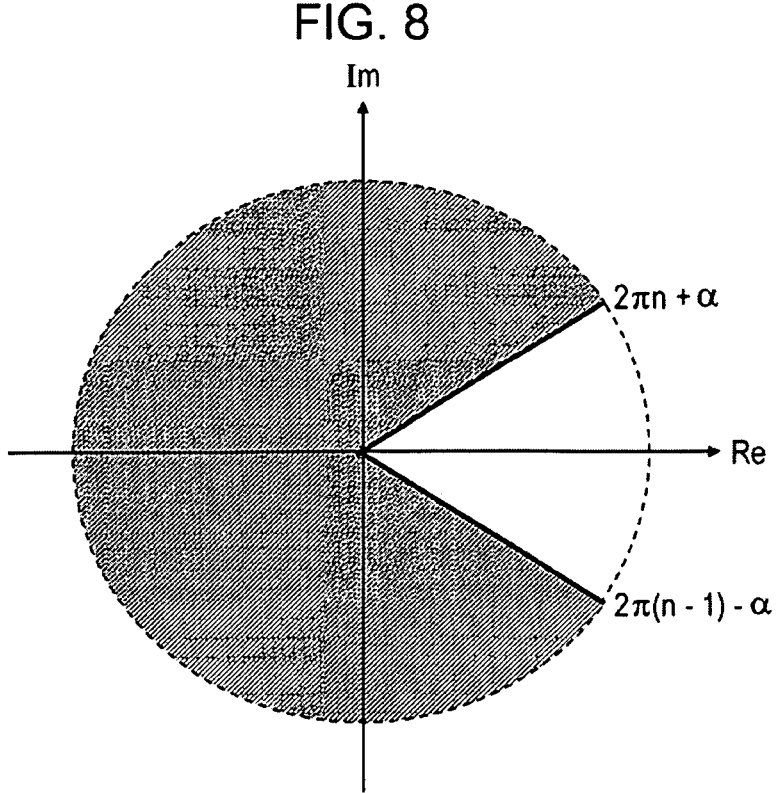
FIG. 8 illustrates the principle of how the super-resolution phenomenon occurs.

As described above, the harmonic component of a k-th order rotates in steps of $2\pi k\phi(1)$. Equation (13) shows that no super-resolution image is obtained if the phase rotation step of the harmonic component of each order is close to an integer multiple of $2\pi$. The phase rotation step close to $2\pi$ means that the phase of the harmonic component remains substantially unchanged even with time t changing. If the phase rotation step satisfies equation (13), a vector V(t) representing the phase rotation angle of the harmonic component rotates in appropriate steps, and the vector sum within the integration time of the visual system is considered sufficiently small. FIG. 8 corresponds to equation (11). If an angle $2\pi k\phi(1)$ falls within a hatched portion of a circle of FIG. 8, a super-resolution image is generated.

Equation (13) describes the condition under which a super-resolution image is obtained. A condition that causes no super-resolution image is written in the following equation (14):

$$2\pi n - \sigma \leq 2\pi k\phi(1) \leq 2\pi n + \sigma \tag{14}$$

If equation (7) is substituted for $\phi(t)$ of equation (14), the following equation (15) results:

$$2\pi n - \sigma \leq 2\pi k\left(\frac{v}{X}\right) \leq 2\pi n + \sigma \tag{15}$$

The condition under which no super-resolution image is generated is thus written in equation (15). If equation (15) is transformed, equation (16) results. Equation (16) defines a subject movement speed v at which no super-resolution image is obtained:

$$\frac{Xn}{k} - \frac{X\sigma}{2\pi k} \leq v \leq \frac{Xn}{k} + \frac{X\sigma}{2\pi k} \quad (16)$$

If the down-sampler 105 performs the 1/M time down-sampling operation, the sampling interval X=M. With $\alpha_M = M\sigma/2\pi$, equation (17) is obtained. Equation (17) defines the range of the subject movement speed v at which no super-resolution image is obtained, by the stop target harmonic component order k and the down-sampling rate (decimation rate) M:

$$\frac{M}{k}n - \frac{\alpha_M}{k} \leq v \leq \frac{M}{k}n + \frac{\alpha_M}{k} \quad (17)$$

Equation (17) defines the movement speed v of the subject under which no super-resolution image is obtained. More specifically, equation (17) indicates the range of the movement speed v of the subject within which the harmonic component of a k-th order generated in the 1/M time down-sampling operation cannot be cancelled in the integration process of the visual system of the observer. For example, the 1/M time down-sampling operation may be performed with the subject moving at a speed v satisfying equation (17). The observer, which visually keeps track of the subject, may perceive the aliasing distortion and recognize the image degradation. Equation (17) indicates that the image degradation takes at a speed of an integer multiple of M/K and within a speed range of ±αM/k with respect to that speed. αM may be determined through psychophysical experiments.

Figure 9:
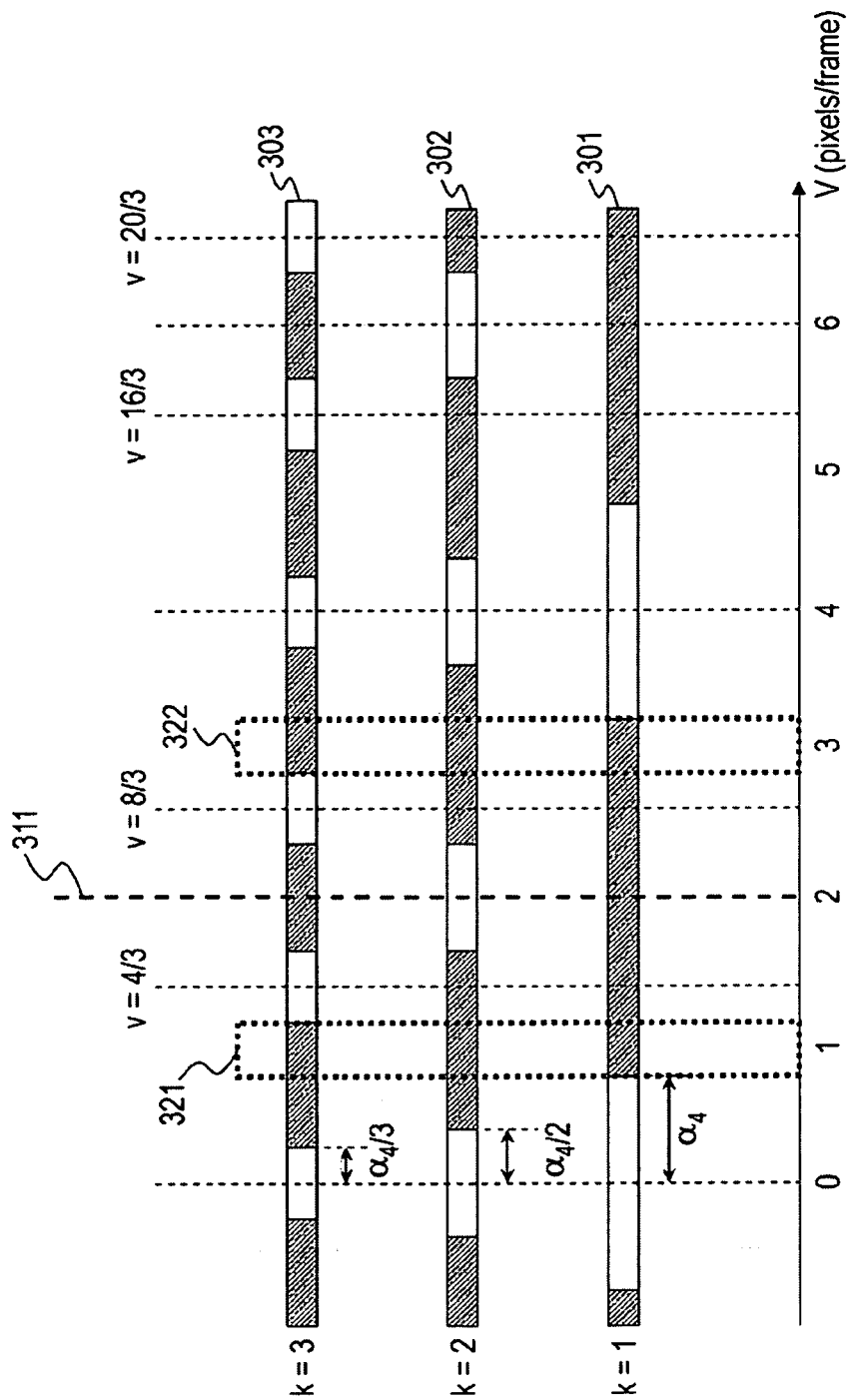
FIG. 9 illustrates a speed range within which the super-resolution effect occurs in the harmonic components of each order in the relationship of a movement speed and a harmonic component order.

FIG. 9 illustrates a relationship between the movement speed v and the stop target harmonic component order k in equation (17). Specifically, FIG. 9 illustrates the relationship between the movement speed v and the stop target harmonic component order k when the 1/M time down-sampling operation is performed with the down-sampling rate (decimation rate) M=4 in order to reduce the input data amount to one-quarter. In other words, FIG. 9 illustrates whether the super-resolution effect takes place or not on the harmonic component of each order generated in the down-sampling operation with M=4.

The abscissa of FIG. 9 represents the movement speed v (pixels/frame). Data 301-303 represents movement speed ranges of the subject within which the harmonic components of the stop target harmonic component order k=1, 2, and 3, namely, the harmonic component of the first order, the second order and the third order are cancelled.

Hatched areas of the data 301-303 fail to satisfy equation (17) and indicate the movement speeds at which the super-resolution effect takes place. If the subject moves at a movement speed falling within the hatched areas, the harmonic component of the corresponding order is thus canceled when the observer visually keeps track of the subject. The aliasing distortion is thus not perceived by the observer.

Blank areas of the data 301-303 satisfy equation (17) and indicates the movement speeds at which no super-resolution effect takes place. If the subject moves at a movement speed falling within the blank areas, the harmonic component of the corresponding order is not canceled when the observer visually keeps track of the subject. The aliasing distortion is thus perceived by the observer. The hatched areas and the blank areas corresponding to the harmonic components of each order shown in FIG. 9 periodically alternate with each other every four pixels/frame in accordance with equation (17). It will be sufficient if a range of consecutive four pixels/frame is considered.

If the subject movement speed v is v=2 pixels/frame in FIG. 9, the super-resolution effect takes place in the harmonic components of the first order (k=1) and the third order (k=3) but no super-resolution effect takes place in the harmonic component of the second order (k=2) as indicated by a broken line 311 drawn to data of harmonic components of k=1 through 3 in FIG. 9.

To obtain a high-quality image, the generation of the aliasing distortion in the harmonic components of all orders needs to be controlled. The speed range that allows such a complete cancellation is small. For example, as shown in FIG. 9, speed ranges 321 and 322 prevent the aliasing distortion from being generated, but are only marginally extended.

As previously discussed with reference to FIGS. 6A-6H, the down-sampler 105 performs the down-sampling operation with the sampling position shifted in response to the sampling phase change rate ΔP. The previously discussed equation (7) describes the shift φ(t) of the sample position in each frame (t) that is integrated when a human observer visually keeps track of the subject:

$$\phi(t) = (vt)/X \quad (7)$$

where X represents the sampling interval, and v represents the shift distance of the subject per frame (unit being pixels). Equation (7) does not take into consideration the sampling phase change rate. In other words, the sampling phase change rate ΔP=0 is assumed.

If the sampling phase change rate ΔP is taken into consideration, equation (7) may be re-written as follows:

$$\phi(t) = \frac{vt}{X} - \frac{\Delta P}{X}t \quad (18)$$
$$= \frac{(v - \Delta P)t}{X}$$

Equation (17) defines the range of the subject movement speed v creating no super-resolution effect by the stop target harmonic component order k and the down-sampling rate (decimation rate) M. Equation (17) may be modified using equation (18), and the following equation (19) results:

$$\left(\frac{M}{k}n + \Delta P\right) - \frac{\alpha_M}{k} \leq v \leq \left(\frac{M}{k}n + \Delta P\right) + \frac{\alpha_M}{k} \quad (19)$$

Equation (19) indicates the speed range of the subject movement speed v in which no super-resolution effect takes place when the down-sampling operation is performed at the sampling phase change rate ΔP. In other words, equation (19) indicates the speed range in which the aliasing distortion takes place. The sampling phase change rate ΔP is lower than the sampling rate (decimation rate) M, i.e., the sampling phase change rate ΔP of from 0 to M−1.

The controller 103 may set any sampling phase change rate within a range of from 0 to M−1. The down-sampler 105 performs the down-sampling operation at the sampling phase change rate ΔP set by the controller 103. The down-sampling operation is performed in the manner previously discussed with reference to FIGS. 6A-6H.

Equation (19) indicates the range of the subject movement speed v creating no super-resolution effect in the down-sampling operation performed at the sampling phase change rate $\Delta P$. The sampling phase change rate $\Delta P$ within the range of from 1 to M−1 failing to satisfy equation (19) can be selected.

For example, equation (19) may fail to hold within the speed range of the subject movement speed v of from v=s to v=s+1 (pixels/frame) at the sampling phase change rate $\Delta P$=0. In such a case, no aliasing distortion takes place within the range of the subject movement speed v of from v=s to v=s+1.

Equation (19) may fail to hold within the speed range of the subject movement speed v of from v=s+1 to v=s+2 at the sampling phase change rate $\Delta P$=1. In such a case, no aliasing distortion takes place within the range of the subject movement speed v of from v=s+1 to v=s+2 with the down-sampling operation performed at the sampling phase change rate $\Delta P$=1.

Similarly, with the sampling phase change rate $\Delta P$=M−1 within the speed range of the subject movement speed v of v=s+M−1 to v=s+M, no aliasing distortion takes place on the subject within the speed range of the subject movement speed v of v=s+M−1 to v=s+M.

The speed range creating the aliasing distortion described in equation (19) is repeated by the period M. As a result, no aliasing distortion is generated at all speeds. The aliasing distortion is prevented from being generated at all orders throughout the speed range of 1 pixel/frame (such as v=s through v=s+1) at the sampling phase change rate $\Delta P$=0. The aliasing distortion is not generated at all speeds within the subject movement speed v of v=s to v=s+1 at the sampling phase change rate $\Delta P$ changed within a range of from 0 to M−1.

FIG. 9 is referred to again. It is assumed that no aliasing distortion is now generated at all in the harmonic component data 303 of FIG. 9. In such a case, the third harmonic component data 303 can be neglected. Only the first and second harmonic component data are considered.

Figure 10:
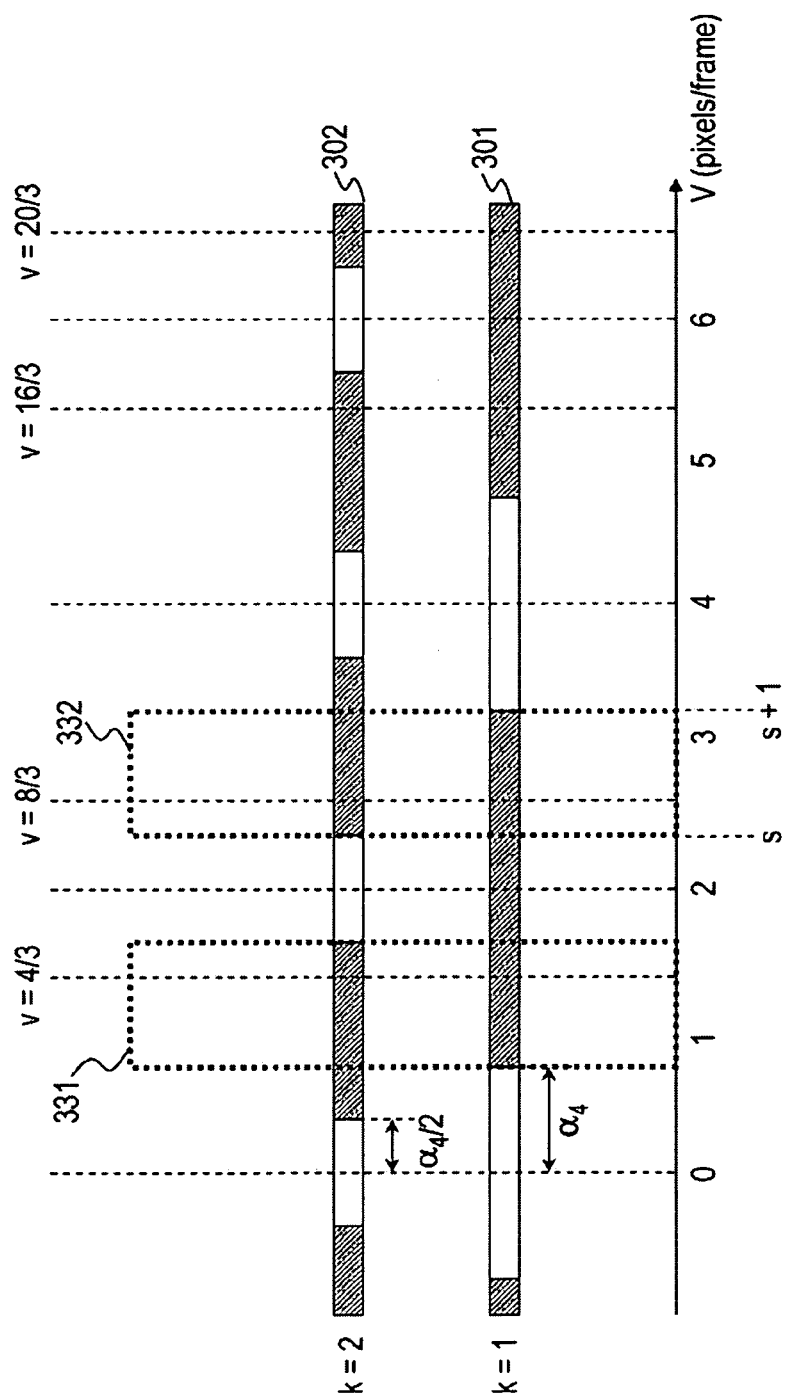
FIG. 10 illustrates the speed range within which the super-resolution effect occurs in the harmonic components of each order in the relationship of the movement speed and the harmonic component order.

FIG. 10 illustrates the correspondence between the movement speed v and the stop target harmonic component order k with the third harmonic component data 303 of FIG. 9 removed. Like FIG. 9, FIG. 10 also illustrates the correspondence between the movement speed v and the stop target harmonic component order k when the input data is reduced to one-quarter through the ¼ time down-sampling operation with the down-sampling amount (decimation amount) M=4. The abscissa represents the subject movement speed v (pixels/frame). Data 301 and 302 represents movement speed ranges of the subject within which the harmonic components of the stop target harmonic component orders k=1, and 2, namely, the harmonic component of the first order and the second order are cancelled. Hatched areas of the data 301 and 302 fail to satisfy equation (17) and indicate the movement speeds at which the super-resolution effect takes place. If the subject moves at a movement speed falling within the hatched areas, the harmonic component of the corresponding order is thus canceled when the observer visually keeps track of the subject. The aliasing distortion is thus not perceived by the observer.

Speed ranges within which no aliasing distortion takes place at all orders are present for about 1 pixel/frame period as depicted by data areas 331 and 332. The data area 332 is a speed range of from v=s to v=s+1. FIG. 10 illustrates data indicating whether the super-resolution effect takes place on the harmonic components of orders of k=1 and 2 at the sampling phase change rate $\Delta P$=0. As previously discussed with reference to FIG. 1, no aliasing distortion takes place in the speed range of from s+1 to s+2 if the sampling phase change rate $\Delta P$ is 1, in the speed range of from s+2 to s+3 if the sampling phase change rate $\Delta P$ is 2, and in the speed range of from s+3 to s+4 if the sampling phase change rate $\Delta P$ is 3. This trend is repeated every four pixels/frame. If $\Delta P$ is appropriately selected, the generation of the aliasing distortion is restricted at all speeds.

In response to the shift distance supplied from the shift detector 102, the controller 103 sets an appropriate sampling phase change rate $\Delta P$ at which no aliasing distortion takes place, and then supplies the set sampling phase change rate $\Delta P$ to the down-sampler 105. More specifically, in response to the shift distance v supplied from the shift detector 102, the controller 103 sets the sampling phase change rate $\Delta P$ that does not satisfy equation (17), and supplies the sampling phase change rate $\Delta P$ to the down-sampler 105. The sampling phase change rate $\Delta P$ may be set in response to the shift distance v on a per block basis.

In order to prevent the aliasing distortion from being generated at a harmonic component of a predetermined order or higher, a high-frequency is removed through a low-pass filter having an appropriate stop band frequency fs. This process is performed by the pre-filter 104 as previously discussed with reference to FIGS. 5A and 5B.

As shown in FIG. 10, it is sufficient if the aliasing distortion caused by the stop target harmonic component order k=3, namely, the third harmonic component is controlled. The controller 103 sets the stop target harmonic component order k to k=3 and then supplies the stop target harmonic component order k=3 to the pre-filter 104.

The pre-filter 104 calculates the stop band frequency fs in accordance with equation (3) in response to the stop target harmonic component order k supplied from the controller 103. The pre-filter 104 generates a band-limited image with a high-frequency component removed as discussed with reference to FIGS. 5A and 5B using a low-pass filter having the stop band frequency fs, and then outputs the resulting image to the down-sampler 105. For example, the band-limited image with the high-frequency component of the third order (k=3) or higher removed is generated if the stop target harmonic component order k is set to 3, and the resulting image is then output to the down-sampler 105.

The down-sampler 105 performs the down-sampling operation discussed with reference to FIG. 6 with the sampling direction and the sampling phase change rate $\Delta P$ supplied from the controller 103. In response to the shift distance v supplied from the shift detector 102, the controller 103 determines the sampling direction and the sampling phase change rate $\Delta P$ so that equation (17) is not satisfied. The controller 103 supplies the results to the down-sampler 105.

The down-sampler 105 performs the down-sampling operation in accordance with the sampling direction and the sampling phase change rate $\Delta P$ input from the controller 103. Equation (17) remains unsatisfied, in other words, the super-resolution effect is generated. When the observer visually keeps track of the subject, the harmonic component of the corresponding order is thus cancelled. The observer can see the image in a manner free from the aliasing distortion. The sampling phase change rate $\Delta P$ may be set in accordance with the shift distance v on a per block basis. The down-sampler 105 receives the sampling phase change rate $\Delta P$ on a per block basis from the controller 103, and then performs the down-sampling operation with the received sampling phase change rate $\Delta P$ applied.

Figure 11:
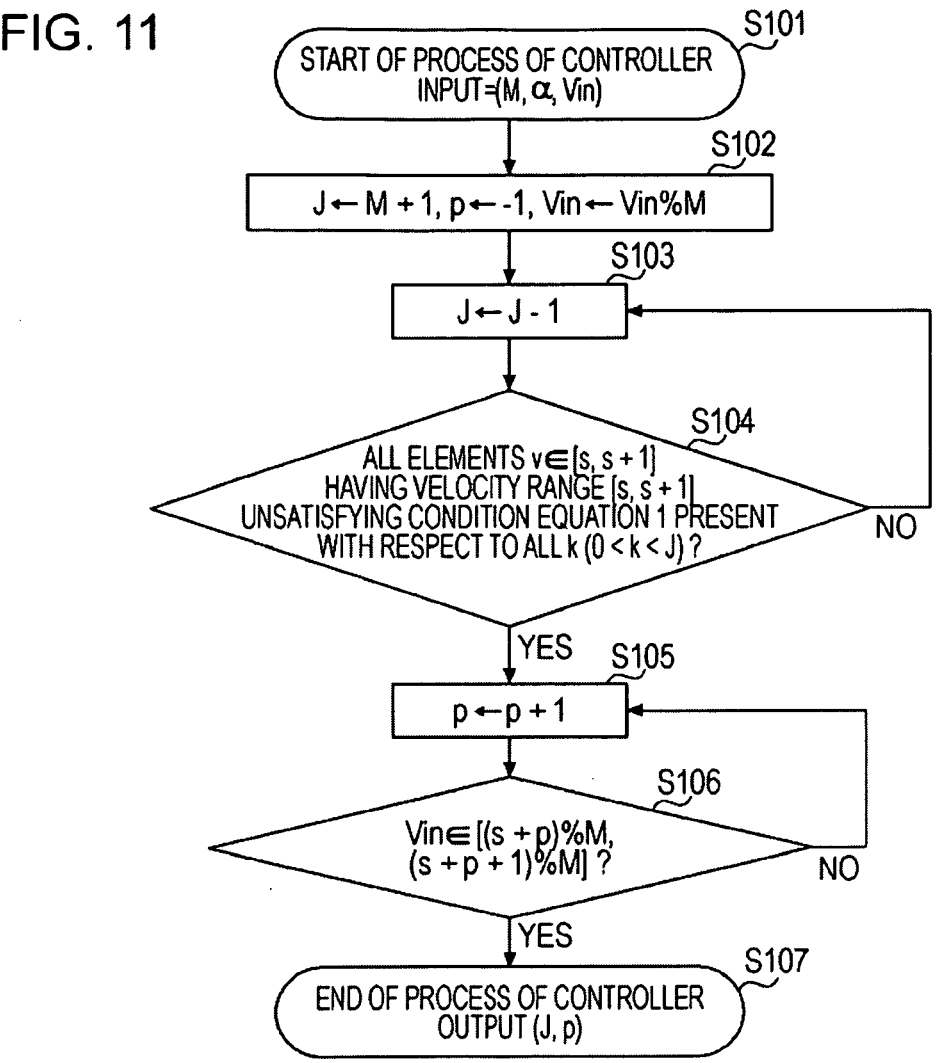
FIG. 11 is a flowchart illustrating a process of a controller in the moving image converting apparatus.

The process of the controller 103 is described below with reference to a flowchart of FIG. 11. In the flowchart of FIG. 11, the controller 103 determines the stop target harmonic component order K and the sampling phase change rate of one block.

In step S101, the controller 103 receives the down-sampling rate M, parameter α applied to condition equation (1) for use in step S103, and the movement speed Vin (scalar value) for each block.

The movement speed Vin for the block is supplied from the shift detector 102. The down-sampling rate M and the parameter α are supplied from the outside.

Subsequent to the reception of these inputs, the controller 103 initializes variables in step S102, namely, J=M+1 and p=−1. Furthermore, with Vin←Vin % M, the range of the movement speed Vin of the block is set to (0,M). Here, % represents an remainder operation.

J is determined in this process and represents a stop target harmonic component order J to be output to the pre-filter 104, and p is a sampling phase change rate p also determined in this process and to be output to the down-sampler 105. Initial values are J=M+1 and p=−1.

In step S103, 1 is subtracted from J to result in J=M. In a loop of step S103 to step S104, the super-resolution effect takes place in the movement speed v of 1 pixel/frame period, namely, period [s,s+1]. The controller 103 determines the order above which the harmonic component is removed using the filter. More specifically, the controller 103 determines whether s failing to satisfy the following condition equation (1) is present at all movement speeds v∈[s,s+1] at all harmonic component orders k (0<k<J):

$$\frac{M}{k}n - \frac{\alpha}{k} \le v \le \frac{M}{k}n + \frac{\alpha}{k} \qquad \text{(condition equation 1)}$$

Condition equation (1) corresponds to equation (19) at the sampling phase change rate ΔP=0, namely, corresponds to equation (17). Equation (19) defines the range of the subject movement speed v creating no super-resolution image in the down-sampling operation performed at the sampling phase change rate ΔP, i.e., defines the speed range in which the aliasing distortion is created by the harmonic component of k-th order.

In the loop of from step S103 to step S104, the controller 103 determines whether s failing to satisfy the following condition equation (1) is present at all movement speeds v∈[s,s+1] at all harmonic component orders k (0<k<J). This process determines the order above which the harmonic components needs to be removed using the filter in order for the super-resolution effect to be generated in 1 pixel/frame period, namely, range [s,s+1].

If it is determined that s failing to satisfy the following condition equation (1) is not present at all movement speeds v∈[s,s+1] at all harmonic component orders k (0<k<J), 1 is subtracted from J. In other words, the upper limit of the stop target harmonic component order k is lowered.

If s failing to satisfy the following condition equation (1) at all movement speeds v∈[s,s+1] at all harmonic component orders k (0<k<J) is detected, J at that moment is set to the stop target harmonic component order.

Processing proceeds to step S105 to update the value of p. More specifically, the value of p is set to be p+1. The sampling phase change rate is determined in a loop of step S105 and step S106. With the value of p incremented by 1 (step S105), the controller 103 determines in step S106 whether Vin falls within a range [(s+p)% M, (s+p+1)% M]. If Vin falls outside the range [(s+p)% M, (s+p+1)% M], p is incremented. Since Vin and the range [(s+p)% M, (s+p+1)% M] has undergone the remainder operation, the loop ends within a range of p=0 to p=M−1.

This loop calculates the sampling phase p to apply the movement speed Vin of the block to s failing to satisfy condition equation (1). As previously discussed with reference to FIGS. 6A-6H, the pixel position to be sampled in the down-sampling operation is not modified if the sampling phase change rate p is to be zero. The pixel position to be sampled in each frame is shifted if the sampling phase change rate p is set to a value other than zero. When a compressed image is reproduced, the block movement speed Vin is visually different from the movement speed at the original block. The movement speed that prevents condition equation (1) from holding is thus obtained. The super-resolution effect is generated. As a result, a compressed image to become a high-quality reproduced image free from the aliasing distortion is thus generated.

In step S107, J obtained in the loop of steps S103 and S104, and p obtained in the loop of steps S105 and S106 are output as (J,p). J as the stop target harmonic component order is then supplied to the pre-filter 104, and p as the sampling phase change rate is supplied to the down-sampler 105.

The controller 103 sets the down-sampling direction to the block. The controller 103 also sets whether do down-sample the block. Such settings may be entered using any method. For example, the shift distance of the block in an X direction is compared with the shift distance of the block in a Y direction and the down-sampling operation is performed in the direction in which the shift distance is larger. If the shift distance in the down-sampling direction is equal to or larger than a predetermined threshold, the down-sampling operation is to be performed. If the shift distance in the down-sampling direction is less than the predetermined threshold, the down-sampling operation is not to be performed.

As described above, the controller 103 uses the information of the block movement speed that causes the super-resolution effect responsive to the time integration effect of the vision calculated the harmonic component data of each order generated in the 1/M time down-sampling operation. The controller 103 thus determines the stop target harmonic component order K that allows the down-sampling operation to be performed within only the subject speed range creating the super-resolution effect. The controller 103 supplies the stop target harmonic component order K to the pre-filter 104. The pre-filter 104 receives from the controller 103 the stop target harmonic component order K (K being an integer falling within a range of 1<K<M). The pre-filter 104 performs the band-limiting operation using the low-pass filter. The low-pass filter removes a high-frequency component equal to or higher than the stop band frequency fs that is set so that the harmonic component of K-th order or higher, of the harmonic components generated in the 1/M time down-sampling operation, may not overlap the original signal component.

The controller 103 determines the stop target harmonic component order K=L+1 with respect to a maximum L that allow a shift distance v0 to be present, the shift distance v0 causing the observer to be unable to observe the harmonic component of an L-th or lower due to the time integration effect of vision of the observer if the observer visually keeps track of the subject moving at a movement speed within a range of from block shift distance v=v0 (pixels/frame) to v=v0+1 (pixels/frame) with respect to all the harmonic components having the L-th order or lower of the harmonic components generated in the 1/M time down-sampling operation performed on the moving image data by the down-sampler 105 with the sampling phase change rate being zero. The controller 103 determines that the observer becomes unable to observe the harmonic component of a k-th order at the block shift distance v if the block shift distance v fails to satisfy condition $(N-\alpha)M/k \leq v \leq (N+\alpha)M/k$ with respect to a predetermined threshold $\alpha$ and any integer N and then determines the stop target harmonic component order K=L+1 based on the determination results.

The controller 103 calculates the sampling phase change rate ($\Delta P$) of each frame on a per block basis, the sampling phase change rate causing the observer to be unable to observe aliasing distortion due to the time integration effect of vision of the observer if the observer visually keeps track of the moving image at the block shift distance detected by the shift detector 102, and the aliasing distortion generated by the stop target harmonic components having an order lower than K of the harmonic components generated in the 1/M time down-sampling operation. The controller 103 then supplies the sampling phase change rate $\Delta P$ to the down-sampler 105.

The moving image converting apparatus 100 segments the input moving image, performs an appropriate band-limiting operation on each block, and performs the down-sampling operation in accordance with an appropriate sampling phase change rate. The moving image converting apparatus 100 thus compresses the moving image data. The compression results are compressed data containing blocks having a movement speed causing condition equation (1) not to hold. The image reproduced from the compressed data has the super-resolution effect, and is thus a high-quality image free from the aliasing distortion.

A moving image reproducing apparatus 500 is described below. The moving image reproducing apparatus 500 decompresses the image data compressed in the above-described process, thereby generating a reproduced image.

Figure 12:
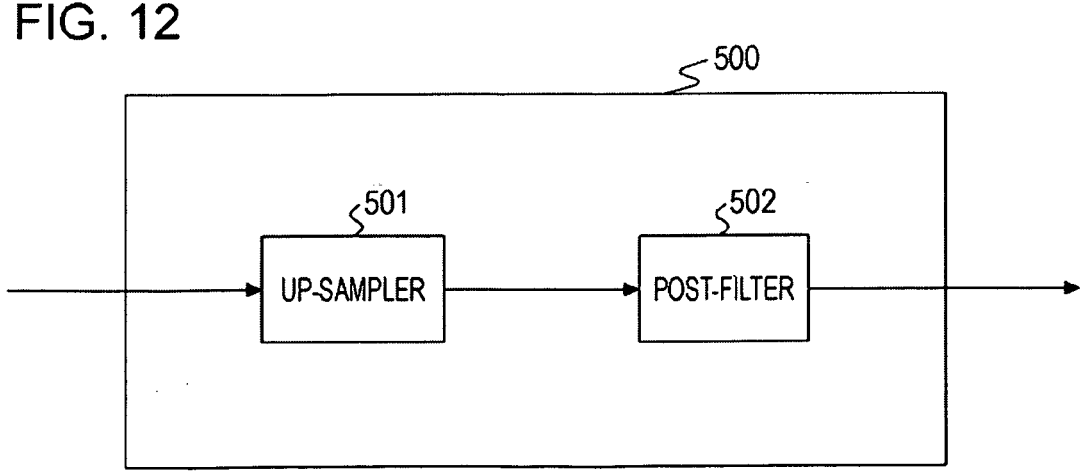
FIG. 12 illustrates a moving image reproducing apparatus in accordance with one embodiment of the present invention.
Figure 13A:
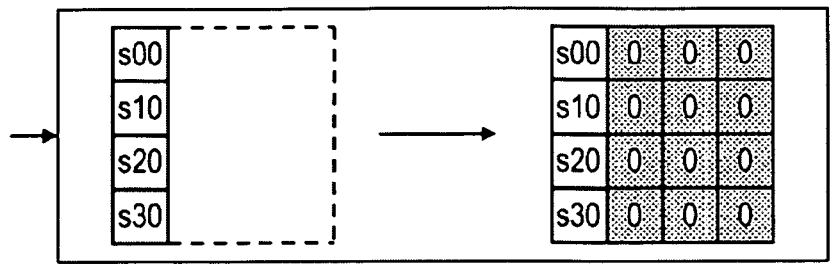
FIGS. 13A-13H illustrate a process of an up-sampler in the moving image reproducing apparatus.
Figure 13B:
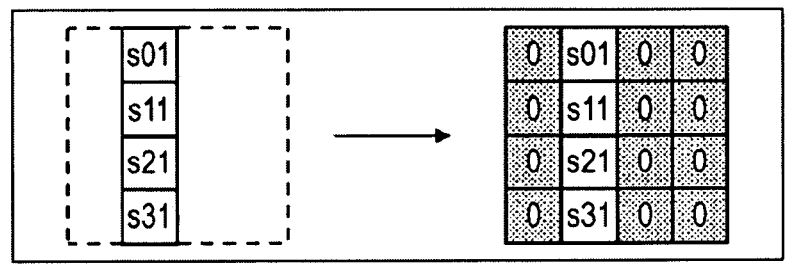
Figure 13C:
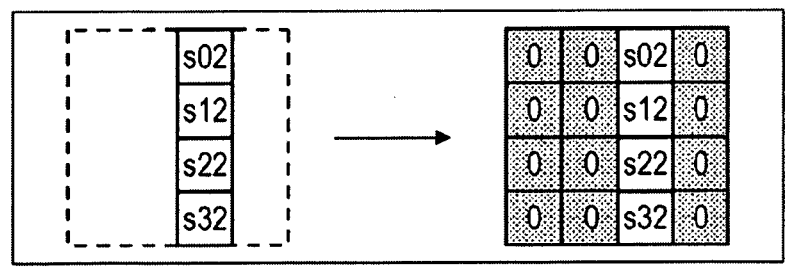
Figure 13D:
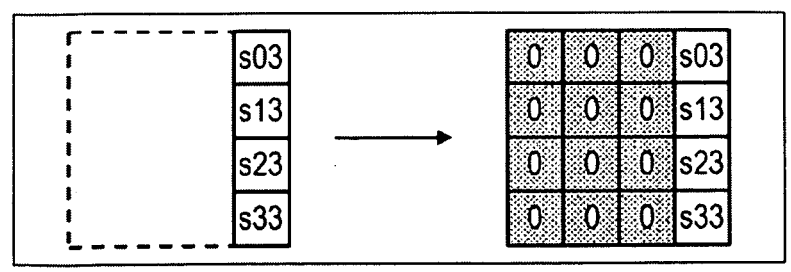
Figure 13E:
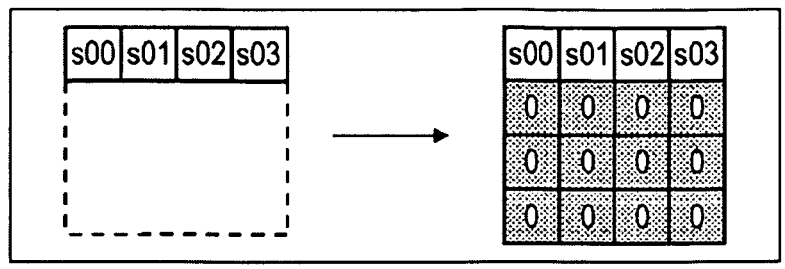
Figure 13F:
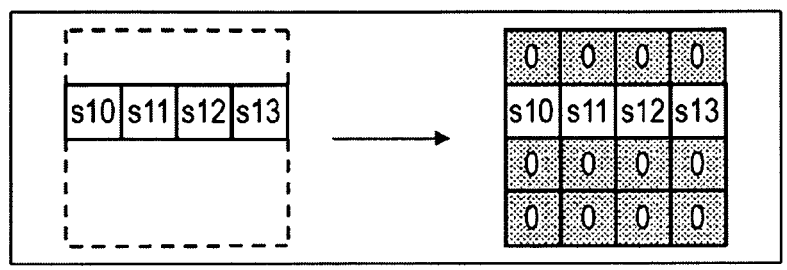
Figure 13G:
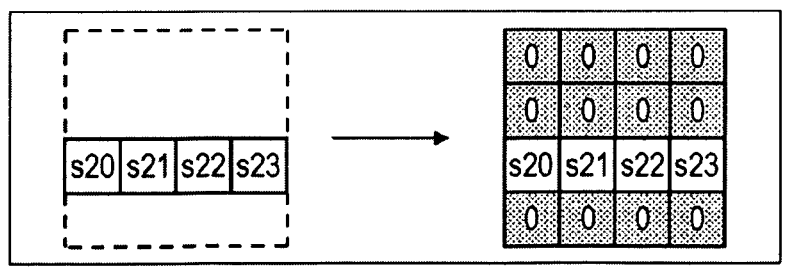
Figure 13H:
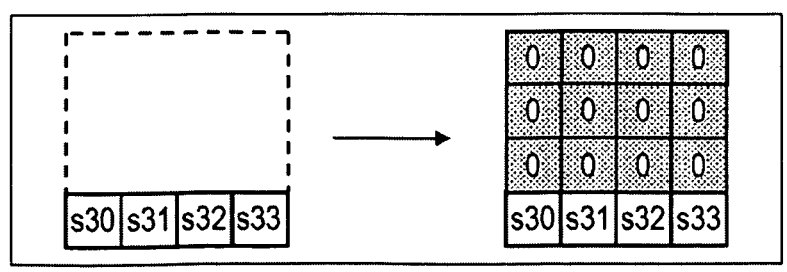

FIG. 12 illustrates the moving image reproducing apparatus 500. The moving image reproducing apparatus 500 reproduces the converted data from the moving image converting apparatus 100, and reconstructs the moving image data in a manner such that the observer may not perceive the image degradation caused by data reduction. The moving image reproducing apparatus 500 of FIG. 12 is described below.

An up-sampler 501 inputs the compressed image data generated by the moving image converting apparatus 100 discussed with reference to FIG. 1, arranges the image data contained in the input converted data, and restores the number of pixels in an up-sampling operation. The moving image converting apparatus 100 thus reconstructs frames of complete moving image data. By performing a filtering operation on the pixels forming each block of the moving image data supplied from the up-sampler 501, a post-filter 502 adjusts and interpolates pixel values so that the observer may not perceive the image degradation. The process of each of the up-sampler 501 and the post-filter 502 is described below.

The process of the up-sampler 501 is described with reference to FIGS. 13A-13H. The up-sampler 501 restores the number of pixels that has been eliminated by the down-sampler 105 in the moving image converting apparatus 100 discussed with reference to FIG. 1. As previously discussed with reference to FIGS. 5A and 5B, the down-sampler 105 in the moving image converting apparatus 100 performs the 1/M time down-sampling operation and reduces the input image to 1/M times the original data amount. Part of the pixels forming each block remains with the rest of the pixels discarded.

The up-sampler 501 in the moving image reproducing apparatus 500 arranges the converted data of each pixel back in the originally placed location thereof within the block. The converted data herein is the part of the pixels forming the block, and remaining through the down-sampling operation. The up-sampler 501 sets a provisional pixel value=0 for the rest of the pixels, discarded and having no pixel data. This process equalizes the up-sampled image with the original image in pixel count.

FIGS. 13A-13H illustrate the up-sampling operation performed by the up-sampler 501. The moving image converting apparatus 100 has performed the ¼ time down-sampling operation on the input data with the down-sampling rate (decimation rate) M, resulting in one-quarter data amount. The up-sampler 501 here performs the up-sampling operation on such ¼ time down-sampled data from the moving image converting apparatus 100.

As shown in FIGS. 13A-13H, each block has a block size of 4 pixels by 4 pixels. The down-sampler 105 in the moving image converting apparatus 100 performs the ¼ time down-sampling operation with the block size of 4 pixels by 4 pixels, the down-sampling rate M=4, and the sampling phase change rate $\Delta P=1$.

Such down-sampled data is up-sampled. Pixels s00 through s33 are the pixels remaining through the down-sampling operation, namely, the pixels supplied as the converted data.

FIGS. 13A-13D represent the up-sampling operation performed in a horizontal direction and FIGS. 13E-13H represent the up-sampling operation performed in a vertical direction. Data enclosed in each broken-lined box on the left portions of FIGS. 13A-13D correspond to one block of down-sampled data, and the number of data units forming each block is one-quarter of the number of pixels in the original block.

The up-sampler 501 places the image data contained in the converted data at the original pixel locations, and sets a pixel value of zero at a pixel location from which the corresponding pixel has been discarded through the down-sampling operation. The pixel count is thus restored back to the original 4×4=16 pixels.

The up-sampling operations of FIG. 13A-13D corresponding to the horizontal down-sampling operation also denote blocks at the same position in four consecutive frames. In a leading frame of FIG. 13A, only the leftmost pixel data at a sampling position 0 is set as having original pixel values, and the rest of the pixels are set as having a pixel value=0. In a next frame of FIG. 13B, only pixel data at a sampling position 1, namely, at the second column from the left, is set as having original pixel values, and the rest of the pixels are set as having a pixel value=0. In a next frame of FIG. 13C, only pixel data at a sampling position 2, namely, at the third column from the left, is set as having original pixel values, and the rest of the pixels are set as having a pixel value=0. In a next frame of FIG. 13D, only pixel data at a sampling position 3, namely, at the fourth column from the left, is set as having original pixel values, and the rest of the pixels are set as having a pixel value=0.

The up-sampling operations of FIG. 13E-13H corresponding to the vertical down-sampling operation also denote blocks at the same position in four consecutive frames. In a leading frame of FIG. 13E, only the topmost pixel data at a sampling position 0 is set as having original pixel values, and the rest of the pixels are set as having a pixel value=0. In a next frame of FIG. 13E, only pixel data at a sampling position 1, namely, at the second row from the top, is set as having original pixel values, and the rest of the pixels are set as having a pixel value=0. In a next frame of FIG. 13G, only pixel data at a sampling position 2, namely, at the third row from the top, is set as having original pixel values, and the rest of the pixels are set as having a pixel value=0. In a next frame of FIG. 13H, only pixel data at a sampling position 3, namely, at the fourth row from the top, is set as having original pixel values, and the rest of the pixels are set as having a pixel value=0.

The up-sampler 501 restores the pixel counts and supplies the restored pixels to the post-filter 502. The process of the post-filter 502 is described below. The post-filter 502 applies an interpolation filter on the image data supplied from the up-sampler 501. The post-filter 502 thus sets to the pixels, discarded in the down-sampling operation and then set to be zero, more appropriate pixel values so that the observer is less likely to perceive the image degradation. The moving image data is thus restored.

A filter as the post-filter 502 may be designed using any method. The post-filter 502 has preferably frequency characteristics blocking a frequency component equal to or higher than the stop band frequency fs of the band-limiting filter used as the pre-filter 104 in the moving image converting apparatus 100.

The use of such a filter is preferable because the pre-filter 104 in the moving image converting apparatus 100 has performed the band-limitation operation with the stop band frequency fs. The band-limitation operation eliminates the frequency component equal to or higher than the stop band frequency fs, and the same is true of the image data applied to the post-filter 502. More specifically, the frequency component equal to or higher the stop band frequency fs in the image data supplied to the post-filter 502 does not contain any original signal component but only a harmonic component. Such a harmonic component is cancelled by the time integration of the vision of the observer and is not perceived by the observer. Even if the frequency component equal to or higher than the stop band frequency fs is left, no image quality improvement is achieved. The frequency component equal to or higher than the stop band frequency fs should be blocked by the post-filter 502.

Figure 14A:
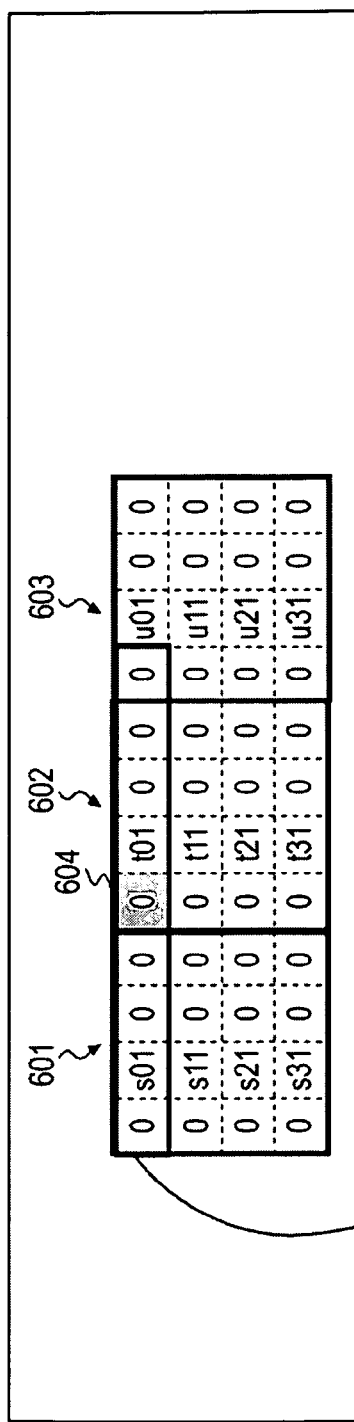
FIGS. 14A and 14B illustrate a filtering process performed by a post-filter in the moving image reproducing apparatus in accordance with one embodiment of the present invention.
Figure 14B:
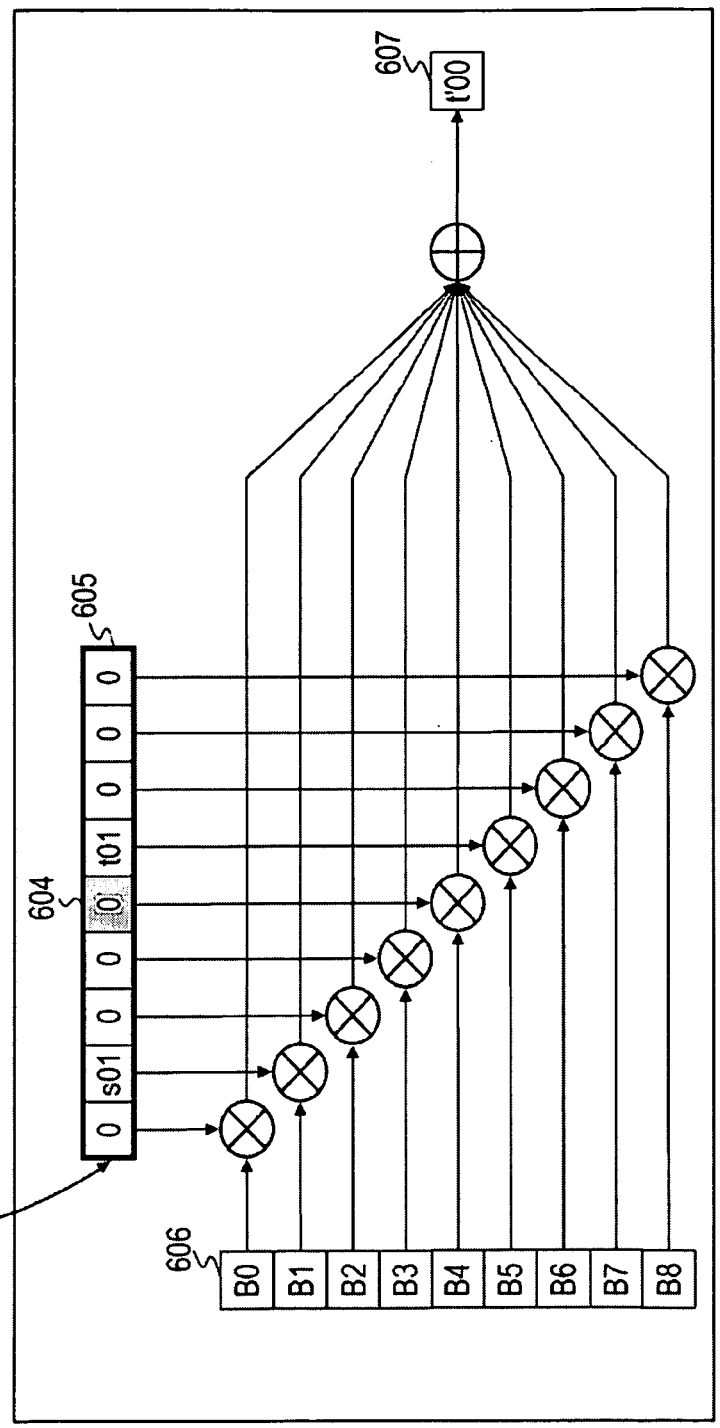

For example, an FIR filter satisfying the above-described conditions is used here as shown in FIGS. 14A and 14B. FIGS. 14A and 14B illustrate an interpolation process of a block size of 4 pixels by 4 pixels to restore the pixel values in response to the ¼ time down-sampling operation performed by the down-sampler 105 in the moving image converting apparatus 100.

The FIR filter of nine taps has impulse response of [B0, B1, B2, B3, B4, B5, B6, B7, B8]. A filtering operation is performed by convoluting the impulse response with the pixel values in one of a vertical direction and a horizontal direction.

FIGS. 14A and 14B illustrate the filtering operation responsive to the down-sampling operation performed in a horizontal direction. The filtering operation is performed on one pixel 604 of pixels forming a block 602 of adjacent blocks 601-603, each containing 4 pixels by 4 pixels as shown in FIG. 14A.

Pixels s01-s31, t01-t31, and u01-u31 of the adjacent blocks 601-603, each containing 4 pixels by 4 pixels, as shown in FIG. 14A, are the pixels remaining without being discarded by the moving image converting apparatus 100. The other pixels forming the blocks are the pixels set to pixel values=0 in an interpolation process of the up-sampler 501.

The interpolation filtering process to be performed on the pixel 604 of FIG. 14A is to perform a multiplication and summing operation of pixel train data 605 of a total of 9 pixels including the pixel 604 and four pixels to the left of the pixel 604 and four pixels to the right of the pixel 604, and the impulse response 606, and handles the operation results as a correction pixel value [t'00]607 of the pixel 604. The same process is performed on the other pixels forming the block.

FIGS. 14A and 14B illustrate the filtering operation with the FIR filter having nine taps. The filtering operation is performed on the 9 pixels containing the target pixel, namely, on the target block containing the target pixel and both blocks of the target block. If the tap length is longer, pixel values in another block may also be used.

Figure 15A:
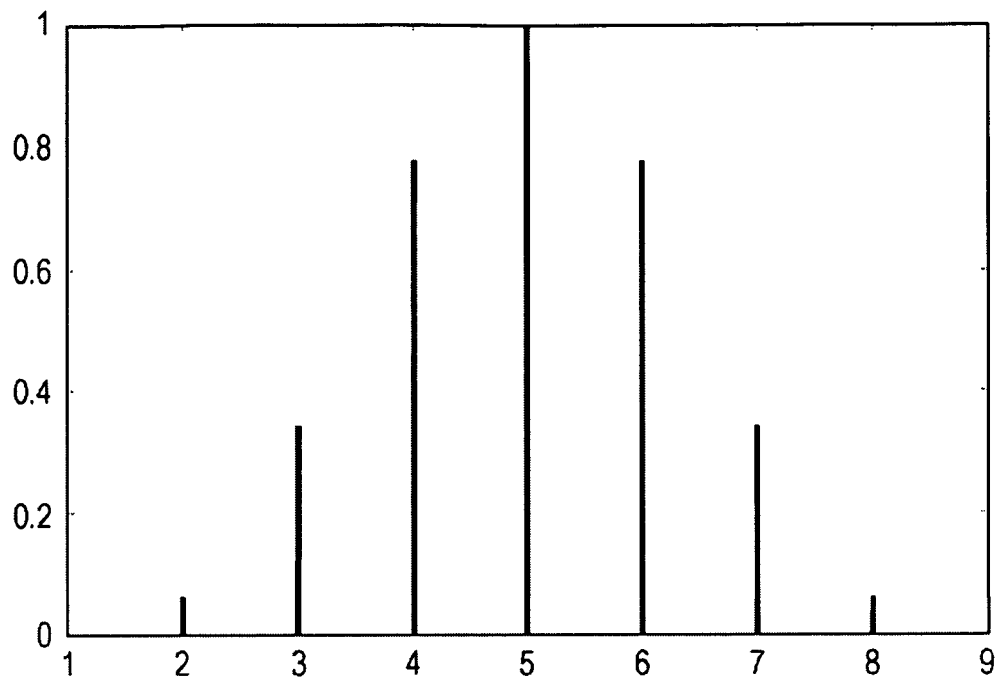
FIGS. 15A and 15B illustrate an impulse response of a FIR filter applied in a filtering process performed by the post-filter in the moving image reproducing apparatus in accordance with one embodiment of the present invention.
Figure 15B:
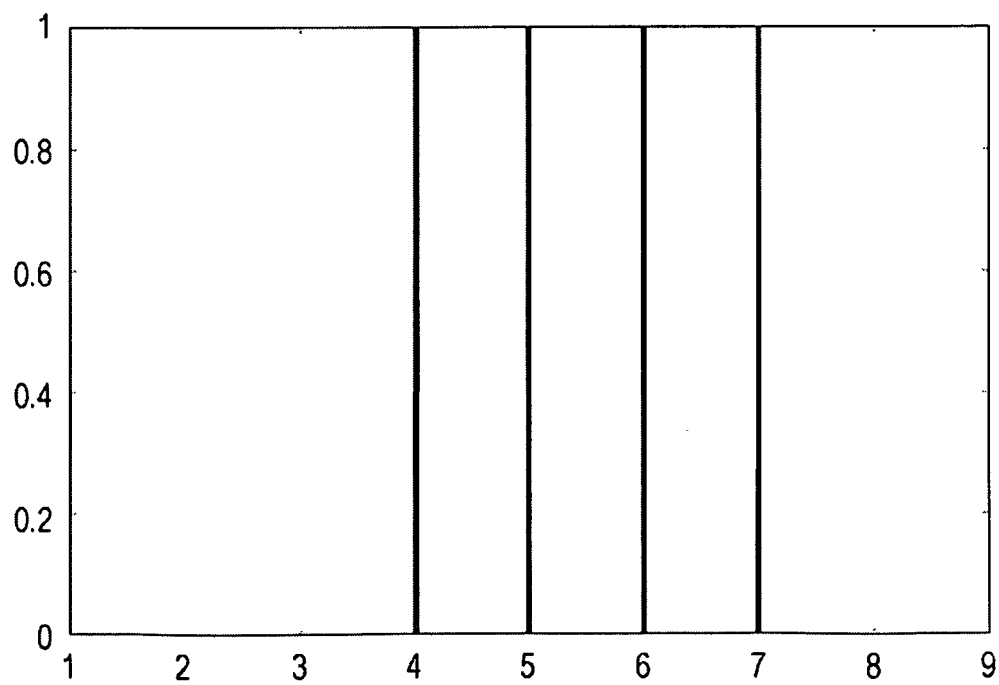

FIG. 14B illustrates the impulse response B0-B8 606 of the nine tape FIR filter. The impulse response B0-B8 may be set as shown in FIGS. 15A and 15B. In FIGS. 15A and 15B, the ordinate represents a contribution ratio (0-1), and the abscissa represents 9 pixels to be interpolation processed through as a filtering operation. The center position (5) of FIGS. 15A and 15B corresponds to a target pixel of the interpolation process. In FIG. 15A, the contribution ratio of a pixel value of a pixel closer to a pixel of interpolation is set to be high, and the contribution ratio of a pixel far from the pixel of interpolation is set to be low. In FIG. 15B, the impulse response is set so that the pixel values of the four pixels adjacent to and containing the pixel of interpolation are used. Other filters having any of a variety of impulse responses than the filters of FIGS. 15A and 15B may also be used.

The filtering operation of the post-filter 502 of FIGS. 14A and 14B is a data compression process in which sampling phases in the down-sampling operation performed on the adjacent blocks by the moving image converting apparatus 100 of FIG. 1 are the same and 1's. The sampling phases of the down-sampling operation performed on the three blocks 601-603 of FIG. 14A are all 1's. The down-sampling direction is the same, namely, horizontal. However, adjacent blocks can be different in process. The filtering operation in such a case is described below with reference to FIG. 16A-16C.

Figures 16A, 16B, 16C:
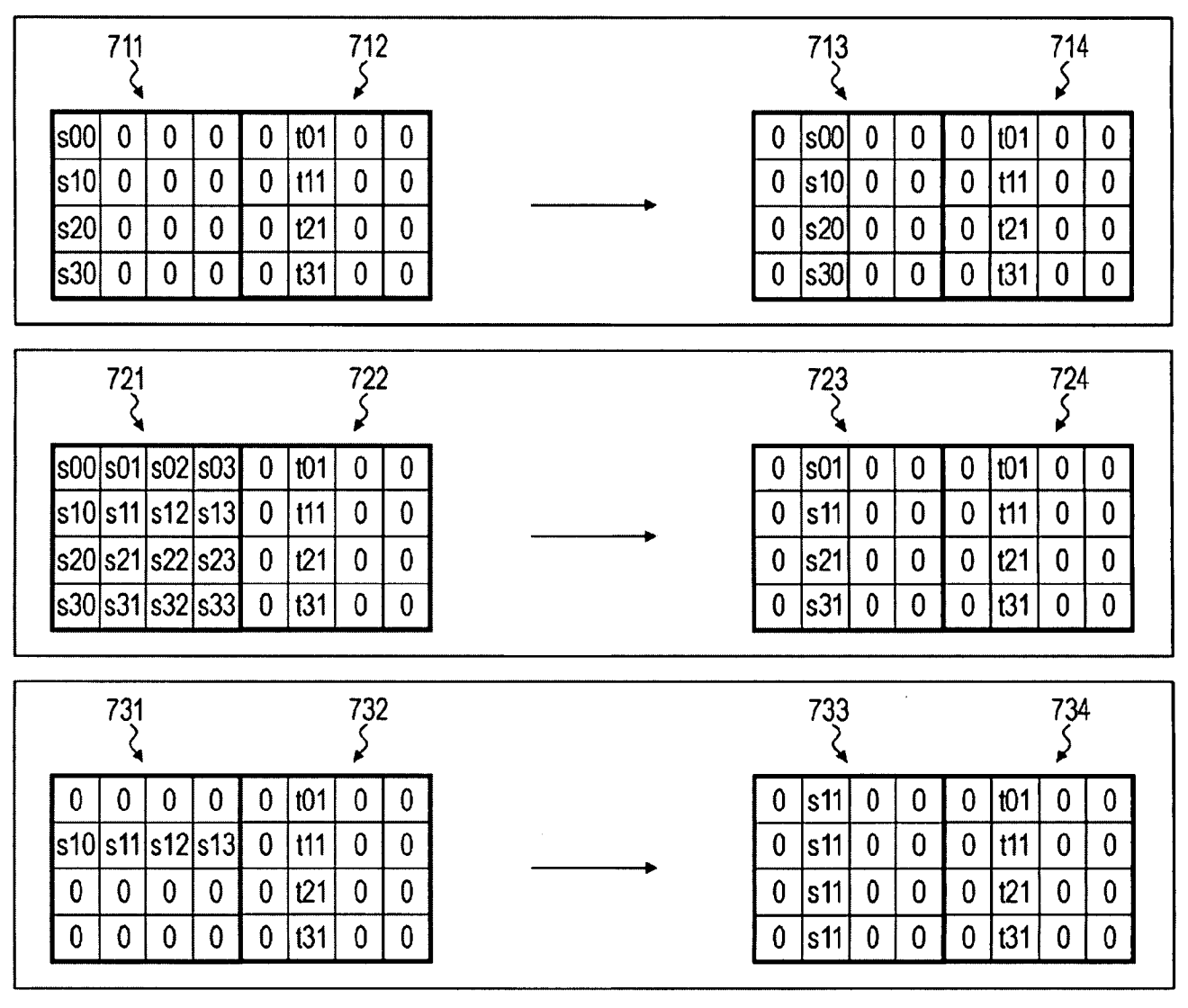

FIGS. 16A-16C illustrate how the filtering operation is to be performed if the mode of the down-sampling operation performed on the adjacent blocks is different, i.e., if the down-sampling operation is different in sampling phases and the sampling directions.

In FIG. 16A, a filtering target block 712 and an adjacent block 711 are equal to each other in down-sampling direction but different from each other in sampling phase. As shown in FIG. 16A, the sampling phase of the filtering target 712 is 1, while the adjacent block 711 has 0 as a sampling phase. The two adjacent blocks are different from each other in sampling phase.

As represented by an arrow in FIG. 16A, the filtering operation is performed with the arrangement of part of pixels in the adjacent blocks modified. A block 714 is a filtering target block and needs no modification. A block 713 is adjacent to the filtering target block 714, and is modified in pixel arrangement. Pixel values of s00 through s30 on the leftmost column in the block 711 prior to the modification are set at a second column from the left. All pixels at the leftmost column in the block 713 become 0's. The phases of the (effective) pixels other than the pixels obtained through the interpolation process of the up-sampler 501 are equalized to the phases of the pixels in the filtering target block.

If the filtering target block and the adjacent block are different in sampling phase, the post-filter 502 equalizes the phase of the effective pixel in the adjacent block to the phase of the pixel in the filtering target block and then performs the filtering operation.

In FIG. 16B, the filtering operation is performed on a block 722 with an adjacent block 721 not down-sampled. In other words, the adjacent blocks are different in sampling frequency. In such a case, the pixel values of the pixels other than the pixels at the sampling position are set to 0 in a block 723 on the premise that the block 723 has been down-sampled in the same direction and the same sampling phase as those of a filtering target block 724. More specifically, a pre-process for equalizing the sampling frequency is performed. Furthermore, the filtering operation is performed on each pixel in the block 724.

In FIG. 16C, the down-sampling operation is performed in a different direction on an adjacent block 731 when a block 732 is filter-processed. In such a case, a pixel arrangement is modified as shown in a block 733. More specifically, a pixel value at the positions having the same sampling phase as the target block, out of the effective pixels on the adjacent block, is vertically copied and the remaining pixels are set to 0. As shown in FIG. 16C, the sampling phase of the target block 732 is 1. An effective pixel s11, out of pixels at the sampling phase of 1 in the adjacent block 731, is copied at the same column and 0 is set at the remaining pixels s10, s12 and s13. A block 733 thus results.

If the mode of the down-sampling operation performed on the adjacent block is different in sampling phase or sampling direction, the post-filter 502 performs the pre-process for equalizing the mode of the down-sampling operation as shown in FIGS. 16A and 16B. The post-filter 502 performs the filtering operation discussed with reference to FIGS. 15A and 15B, thereby setting a pixel value to each pixel. The modification of the adjacent block discussed with reference to FIGS. 16A and 16B is temporarily performed in order to perform the filtering operation on the target block. The output obtained by a result of block processing by the up-sampler 501 is only filtering results related to each pixel forming the block.

The moving image reproducing apparatus 500 performs the up-sampling operation and the interpolation filtering operation on each block of the converted data generated by the moving image converting apparatus 100. The moving image reproducing apparatus 500 thus restores the pixel count with the image degradation minimized.

The particular embodiments of the present invention have been discussed. It will be apparent to those skilled in the art that various modifications and changes can be made to the embodiments without departing from the scope of the present invention. The above-reference embodiments have been disclosed for exemplary purposes only and are not intended to limit the scope of the present invention. The scope of the present invention is limited only the appended claims.

The method steps described above may performed using hardware, software, or a combination of both. If the method steps are performed using software, a program containing the method steps may be installed onto a memory in a computer contained in dedicated hardware or a general-purpose computer that performs a variety of processes. The program may be pre-stored on a recording medium. The program may be installed onto the computer. Alternatively, the program may be received via a network such as a local-area network (LAN) or the Internet and then installed onto the recording medium such as a built-in hard disk.

The above-described method steps may be performed in a time-series order described above. The method steps may be in parallel or separately depending on the throughput of each apparatus. In this specification, the term "system" refers to a logical set of a plurality of apparatuses and elements of each apparatus are not necessarily housed in a single casing.

It should be understood by those skilled in the art that various modifications, combinations, sub-combinations and alterations may occur depending on design requirements and other factors insofar as they are within the scope of the appended claims or the equivalents thereof.

What is claimed is:

1. A moving image converting apparatus for converting moving image data, comprising:

a block segmentator for segmenting a frame of the moving image data into at least one block;

a shift detector for detecting a shift of an image of a subject contained in each of segmented blocks as a block shift distance;

a controller for inputting the block shift distance detected by the shift detector, determining a sampling phase change rate ($\Delta P$) as a process parameter to the block in a down-sampling operation, and determining an order K of a stop target harmonic component based on a super-resolution effect, K being an integral;

a pre-filter for inputting each block segmented by the block segmentator, and removing from each block a high-frequency component equal to or higher than a stop band frequency (fs) calculated based on K; and a down-sampler for inputting a block with the high-frequency component removed therefrom by the pre-filter and downsampling the input block in accordance with the sampling phase change rate ($\Delta P$) in order to reduce the number of pixels of each block by 1/M times, M being an integer greater than 2, wherein K is determined to satisfy: $1<K<M$;

wherein the controller determines the stop target harmonic component order (K) in order to enable the down-sampling operation to be performed with block movement speed range information applied, the down-sampling operation performed within a subject speed range generating the super-resolution effect, the block movement speed range information generating the super-resolution effect in response to a time integration effect of vision calculated with respect to harmonic component data of each order generated in the 1/M time down-sampling operation, and supplies the determined stop target harmonic component order (K) to the pre-filter; and wherein the pre-filter inputs the stop target harmonic component order, and performs a band limitation process of a low-pass filter in order to remove the high frequency component equal to or higher than the stop band frequency (fs), the stop band frequency (fs) being set so that a harmonic component having a K-th order or higher, of the harmonic components generated in the 1/M time down-sampling operation performed by the down-sampler, is free from overlapping an original signal component.

2. The moving image converting apparatus according to claim 1, wherein the controller determines the stop target harmonic component order so that K satisfies: $K=L+1$ with respect to a maximum L allowing a shift distance v0 to be present, the shift distance v0 causing an observer to be unable to observe the harmonic component of an L-th order or lower due to the time integration effect of vision of the observer if the observer visually keeps track of the subject moving at a movement speed within a range of from block shift distance $v=v0$ (pixels/frame) to $v=v0+1$ (pixels/frame) with respect to all the harmonic components having an L-th order or lower of the harmonic components generated in the 1/M time down-sampling operation performed on the moving image data by the down-sampler with the sampling phase change rate being zero.

3. The moving image converting apparatus according to claim 2, wherein the controller determines that the observer becomes unable to observe the harmonic component of a k-th order at the block shift distance v if the block shift distance v fails to satisfy condition $(N-\alpha)M/k \leq v \leq (N+\alpha)M/k$ with respect to a predetermined threshold $\alpha$ and any integer N and then determines the stop target harmonic component order $K=L+1$ based on the determination results.

4. The moving image converting apparatus according to claim 1, wherein the controller calculates the sampling phase change rate ($\Delta P$) of each frame on a per block basis, the sampling phase change rate causing the observer to be unable to observe aliasing distortion due to the time integration effect of vision of the observer if the observer visually keeps track of the moving image at the block shift distance detected by the shift detector, and the aliasing distortion generated by the stop target harmonic components having an order lower than a K-th order of the harmonic components generated in the 1/M time down-sampling operation, and supplies the calculated sampling phase change rate ($\Delta P$) to the down-sampler.

5. The moving image converting apparatus according to claim 1, wherein the down-sampler performs the down-sampling operation with a sampling position changed with respect to the block in step with the advancing of frames, in accordance with the sampling phase change rate ($\Delta P$) for each block input from the controller.

6. The moving image converting apparatus according to claim 1, wherein the pre-filter removes from the block the high-frequency component equal to or higher than the stop band frequency (fs) using one of a stop target harmonic component pre-stored on a memory or a stop target harmonic component input from the outside.

7. A moving image converting method for converting moving image data, comprising steps of:
   segmenting a frame of the moving image data into at least one block;
   detecting a shift of an image of a subject contained in each of segmented blocks as a block shift distance;
   with the detected block shift distance input, controlling determination of a sampling phase change rate ($\Delta P$) as a process parameter to the block in a down-sampling operation;
   determining an order K of a stop target harmonic component based on a super-resolution effect, K being an integral;
   with each segmented block input, removing from each block a high-frequency component equal to or higher than a stop band frequency (fs) calculated based on K; and
   with a block with the high-frequency component removed therefrom input, downsampling the input block in accordance with the sampling phase change rate ($\Delta P$) in order to reduce the number of pixels of each block by 1/M times, M being an integer greater than 2,
   wherein K is determined to satisfy: $1<K<M$;
   wherein K is determined in order to enable the down-sampling operation to be performed with block movement speed range information applied, the down-sampling operation performed within a subject speed range generating the super-resolution effect, and the block movement speed range information generating the super-resolution effect in response to a time integration effect of vision calculated with respect to harmonic component data of each order generated in the 1/M time down-sampling operation, and, supplying the stop target harmonic component order (K); and
   wherein the step of removing the high-frequency component comprises performing a band limitation process of a low-pass filter in order to remove the high frequency component equal to or higher than the stop band frequency (fs), the stop band frequency (fs) being set so that a harmonic component having a K-th order or higher, of the harmonic components generated in the 1/M time down-sampling operation performed by the down-sampler, is free from overlapping an original signal component.

8. The moving image converting method according to claim 7, wherein the step of controlling the determination of the sampling phase change rate ($\Delta P$) comprises determining the stop target harmonic component order so that K satisfies: $K=L+1$ with respect to a maximum L allowing a shift distance v0 to be present, the shift distance v0 causing an observer to be unable to observe the harmonic component of an L-th order or lower due to the time integration effect of vision of the observer if the observer visually keeps track of the subject moving at a movement speed within a range of from block shift distance v=v0 (pixels/frame) to v=v0+1 (pixels/frame) with respect to all the harmonic components having an L-th order or lower of the harmonic components generated in the 1/M time down-sampling operation performed on the moving image data by the down-sampler with the sampling phase change rate being zero.

9. The moving image converting method according to claim 8, wherein the step of controlling the determination of the sampling phase change rate ($\Delta P$) comprises determining that the observer becomes unable to observe the harmonic component of a k-th order at the block shift distance v if the block shift distance v fails to satisfy condition $(N-\alpha)M/k \leq v \leq (N+\alpha)M/k$ with respect to a predetermined threshold $\alpha$ and any integer N and determining the stop target harmonic component order $K=L+1$ based on the determination results.

10. The moving image converting method according to claim 7, wherein the step of controlling the determination of the sampling phase change rate ($\Delta P$) comprises calculating the sampling phase change rate ($\Delta P$) of each frame on a per block basis, the sampling phase change rate ($\Delta P$) causing the observer to be unable to observe aliasing distortion due to the time integration effect of vision of the observer if the observer visually keeps track of the moving image at the block shift distance detected by the shift detector, and the aliasing distortion generated by the stop target harmonic components having an order lower than K of the harmonic components generated in the 1/M time down-sampling operation, and supplying the calculated sampling phase change rate ($\Delta P$).

11. The moving image converting method according to claim 7, wherein the step of down-sampling comprises performing the down-sampling operation with a sampling position changed with respect to the block in step with the advancing of frames, in accordance with the sampling phase change rate ($\Delta P$) for each input block.

12. The moving image converting method according to claim 7, wherein the removal of the high-frequency component comprises using one of a stop target harmonic component pre-stored on a memory or a stop target harmonic component input from the outside.

13. A non-transitory computer-readable medium storing instructions which, when executed by a computer, cause the computer to process moving image data, comprising steps of:
   segmenting a frame of the moving image data into at least one block;
   detecting a shift of an image of a subject contained in each of segmented blocks as a block shift distance;
   with the detected block shift distance input, controlling determination of a sampling phase change rate ($\Delta P$) as a process parameter to the block in a down-sampling operation;

determining an order K of a stop target harmonic component based on a super-resolution effect, K being an integral;

with each segmented block input, removing from each block a high-frequency component equal to or higher than a stop band frequency (fs) calculated based on K; and with a block with the high-frequency component removed therefrom input, downsampling the input block in accordance with the sampling phase change rate ($\Delta P$) in order to reduce the number of pixels of each block by 1/M times, M being an integer greater than 2, wherein K is determined to satisfy: $1<K<M$;

wherein K is determined in order to enable the downsampling operation to be performed with block movement speed range information applied, the down-sampling operation performed within a subject speed range generating the super-resolution effect, and the block movement speed range information generating the super-resolution effect in response to a time integration effect of vision calculated with respect to harmonic component data of each order generated in the 1/M time down-sampling operation, and, supplying the stop target harmonic component order (K); and wherein the step of removing the high-frequency component comprises performing a band limitation process of a low-pass filter in order to remove the high frequency component equal to or higher than the stop band frequency (fs), the stop band frequency (fs) being set so that a harmonic component having a K-th order or higher, of the harmonic components generated in the 1/M time down-sampling operation performed by the down-sampler, is free from overlapping an original signal component.

* * * * *